US012276091B2

(12) United States Patent
Friesen et al.

(10) Patent No.: US 12,276,091 B2
(45) Date of Patent: Apr. 15, 2025

(54) SYSTEMS AND METHODS FOR MANAGING PRODUCTION AND DISTRIBUTION OF LIQUID WATER EXTRACTED FROM AIR

(71) Applicant: Source Global, PBC, Scottsdale, AZ (US)

(72) Inventors: Cody Friesen, Scottsdale, AZ (US); Jonathan Goldberg, Scottsdale, AZ (US); Grant Friesen, Scottsdale, AZ (US)

(73) Assignee: Source Global, PBC, Scottsdale, AZ (US)

( * ) Notice: Subject to any disclaimer, the term of this patent is extended or adjusted under 35 U.S.C. 154(b) by 372 days.

(21) Appl. No.: 17/736,027

(22) Filed: May 3, 2022

(65) Prior Publication Data

US 2022/0259838 A1     Aug. 18, 2022

Related U.S. Application Data

(63) Continuation of application No. 16/644,465, filed as application No. PCT/US2018/049411 on Sep. 4, 2018, now Pat. No. 11,359,356.
(Continued)

(51) Int. Cl.
*E03B 3/28* (2006.01)
*B01D 53/14* (2006.01)
*B01D 5/00* (2006.01)

(52) U.S. Cl.
CPC ............ *E03B 3/28* (2013.01); *B01D 53/1412* (2013.01); *B01D 5/009* (2013.01); *B01D 2257/80* (2013.01)

(58) Field of Classification Search
None
See application file for complete search history.

(56) References Cited

U.S. PATENT DOCUMENTS

| 1,816,592 A | 7/1931 | Knapen |
| 2,138,689 A | 11/1938 | Altenkirch |

(Continued)

FOREIGN PATENT DOCUMENTS

| CN | 1592831 | 3/2005 |
| CN | 101278164 | 3/2005 |

(Continued)

OTHER PUBLICATIONS

CN104420501A_ENG (Espacenet machine translation of Shen) (Year: 2015).*

(Continued)

*Primary Examiner* — Brian A McCaig
(74) *Attorney, Agent, or Firm* — Fish & Richardson P.C.

(57) ABSTRACT

This disclosure relates to systems and methods for managing production and distribution of liquid water extracted from air. In certain embodiments, a system is provided that includes a plurality of local water generation units (110) including a first local water generation unit and a second local water generation unit. The first and second water generation units each include a controller that is configured to control a production rate of liquid water extracted from the air, a local water collection unit, and a local transceiver. A principal water supply unit (120) is in fluid communication with at least one of the local water collection units. The principal water supply unit is configured to store at least part of the liquid water extracted from the air and to maintain a principal water level at a reservoir of the principal water supply unit based on one or more operational parameters for water distribution.

20 Claims, 11 Drawing Sheets

Related U.S. Application Data

(60) Provisional application No. 62/554,176, filed on Sep. 5, 2017.

(56) References Cited

U.S. PATENT DOCUMENTS

| | | |
|---|---|---|
| 2,284,914 A | 6/1942 | Miller |
| 2,462,952 A | 3/1949 | Dunkak |
| 2,700,537 A | 1/1955 | Pennington |
| 2,761,292 A | 9/1956 | Coanda et al. |
| 3,102,532 A | 9/1963 | Shoemaker |
| 3,400,515 A | 9/1968 | Ackerman |
| 3,676,321 A | 7/1972 | Cummings et al. |
| 3,683,591 A | 8/1972 | Glav |
| 3,726,778 A | 4/1973 | Seltzer et al. |
| 3,740,959 A | 6/1973 | Foss |
| 3,844,737 A | 10/1974 | Macriss et al. |
| 3,889,532 A | 6/1975 | Pilie et al. |
| 3,889,742 A | 6/1975 | Rush et al. |
| 4,054,124 A | 10/1977 | Knoos |
| 4,080,186 A | 3/1978 | Ockert |
| 4,117,831 A | 10/1978 | Bansal et al. |
| 4,134,743 A | 1/1979 | Macriss et al. |
| 4,136,672 A | 1/1979 | Hallanger |
| 4,146,372 A | 3/1979 | Groth et al. |
| 4,169,459 A | 10/1979 | Ehrlich |
| 4,185,969 A | 1/1980 | Bulang |
| 4,201,195 A | 5/1980 | Sakhuja |
| 4,219,341 A | 8/1980 | Hussmann |
| 4,222,244 A | 9/1980 | Meckler |
| 4,234,037 A | 11/1980 | Rogers et al. |
| 4,242,112 A | 12/1980 | Jebens |
| 4,285,702 A | 8/1981 | Michel et al. |
| 4,304,577 A | 12/1981 | Ito et al. |
| 4,315,599 A | 2/1982 | Biancardi |
| 4,334,524 A | 6/1982 | McCullough |
| 4,342,569 A | 8/1982 | Hussmann |
| 4,345,917 A | 8/1982 | Hussmann |
| 4,351,651 A | 9/1982 | Courneya |
| 4,374,655 A | 2/1983 | Grodzka et al. |
| 4,377,398 A | 3/1983 | Bennett |
| 4,398,927 A | 8/1983 | Asher et al. |
| 4,405,343 A | 9/1983 | Othmer |
| 4,433,552 A | 2/1984 | Smith |
| 4,478,210 A | 10/1984 | Sieradski |
| 4,722,192 A | 2/1988 | Koblitz et al. |
| 4,726,817 A | 2/1988 | Roger |
| 4,926,618 A | 5/1990 | Ratliff |
| 5,058,388 A | 10/1991 | Shaw et al. |
| 5,123,777 A | 6/1992 | Tadros |
| 5,148,374 A | 9/1992 | Coellner |
| 5,213,773 A | 5/1993 | Burris |
| 5,275,643 A | 1/1994 | Usui |
| 5,470,484 A | 11/1995 | McNeel |
| 5,579,647 A | 12/1996 | Calton et al. |
| 5,701,749 A | 12/1997 | Zakryk |
| 5,718,122 A | 2/1998 | Maeda |
| 5,729,981 A | 3/1998 | Markus et al. |
| 5,758,511 A | 6/1998 | Yoho et al. |
| 5,826,434 A | 10/1998 | Belding et al. |
| 5,846,296 A | 12/1998 | Krumsvik |
| 5,873,256 A | 2/1999 | Denniston |
| 5,989,313 A | 11/1999 | Mize |
| 6,029,467 A | 2/2000 | Moratalla |
| 6,156,102 A | 12/2000 | Contad et al. |
| 6,199,388 B1 | 3/2001 | Fischer, Jr. |
| 6,336,957 B1 | 1/2002 | Tsymerman |
| 6,447,583 B1 | 9/2002 | Thelen et al. |
| 6,490,879 B1 | 12/2002 | Lloyd et al. |
| 6,511,525 B2 | 1/2003 | Spletzer et al. |
| 6,513,339 B1 | 2/2003 | Kopko |
| 6,557,365 B2 | 5/2003 | Dinnage et al. |
| 6,574,979 B2 | 6/2003 | Faqih |
| 6,644,060 B1 | 11/2003 | Dagan |
| 6,828,499 B2 | 12/2004 | Max |
| 6,869,464 B2 | 3/2005 | Klemic |
| 6,945,063 B2 | 9/2005 | Max |
| 6,957,543 B1 | 10/2005 | Reznik |
| 7,017,356 B2 | 3/2006 | Moffitt |
| 7,043,934 B2 | 5/2006 | Radermacher et al. |
| 7,178,355 B2 | 2/2007 | Moffitt |
| 7,251,945 B2 | 8/2007 | Tongue |
| 7,305,849 B2 | 12/2007 | Loffler et al. |
| 7,306,654 B2 | 12/2007 | King et al. |
| 7,478,535 B2 | 1/2009 | Turner, Jr. et al. |
| 7,740,765 B2 | 6/2010 | Mitchell |
| 7,866,176 B2 | 1/2011 | Vetrovec et al. |
| 7,905,097 B1 | 3/2011 | Fort |
| 7,926,481 B2 | 4/2011 | Edwards et al. |
| 8,075,652 B2 | 12/2011 | Melikyan |
| 8,118,912 B2 | 2/2012 | Rodriguez et al. |
| 8,187,368 B2 | 5/2012 | Shih |
| 8,196,422 B2 | 6/2012 | Ritchey |
| 8,328,904 B2 | 12/2012 | Griffiths et al. |
| 8,425,660 B2 | 4/2013 | Ike et al. |
| 8,506,675 B2 | 8/2013 | Ellsworth |
| 8,844,299 B2 | 9/2014 | Ferreira et al. |
| 8,876,956 B2 | 11/2014 | Ball et al. |
| 9,289,718 B2 | 3/2016 | Dahlback |
| 10,357,739 B2 | 7/2019 | Friesen et al. |
| 10,469,028 B2 | 11/2019 | Friesen et al. |
| 10,632,416 B2 | 4/2020 | Friesen et al. |
| 10,835,861 B2 * | 11/2020 | Friesen ............... B01D 53/06 |
| 11,159,123 B2 | 10/2021 | Friesen et al. |
| 11,160,223 B2 | 11/2021 | Friesen et al. |
| 11,266,944 B2 | 3/2022 | Friesen et al. |
| 11,281,997 B2 | 3/2022 | Friesen et al. |
| 11,285,435 B2 | 3/2022 | Friesen et al. |
| 11,359,356 B2 * | 6/2022 | Friesen ............... C02F 9/00 |
| 11,384,517 B2 | 7/2022 | Friesen et al. |
| 11,414,843 B2 | 8/2022 | Friesen et al. |
| 11,447,407 B2 | 9/2022 | Friesen et al. |
| 11,555,421 B2 | 1/2023 | Friesen et al. |
| 2002/0046569 A1 | 4/2002 | Faqih |
| 2002/0130091 A1 | 9/2002 | Ekberg et al. |
| 2003/0091881 A1 | 5/2003 | Eisler |
| 2003/0101161 A1 | 5/2003 | Ferguson et al. |
| 2004/0000165 A1 | 1/2004 | Max |
| 2004/0055309 A1 | 3/2004 | Bellows et al. |
| 2005/0044862 A1 | 3/2005 | Vetrovec et al. |
| 2005/0084415 A1 | 4/2005 | McVey et al. |
| 2005/0204914 A1 | 9/2005 | Boutall |
| 2005/0249631 A1 | 11/2005 | Schulz et al. |
| 2005/0284167 A1 | 12/2005 | Morgan |
| 2006/0017740 A1 | 1/2006 | Coleman |
| 2006/0032493 A1 | 2/2006 | Ritchey |
| 2006/0060475 A1 | 3/2006 | Applegate et al. |
| 2006/0112709 A1 | 6/2006 | Boyle |
| 2006/0130654 A1 | 6/2006 | King et al. |
| 2006/0288709 A1 | 12/2006 | Reidy |
| 2007/0028769 A1 | 2/2007 | Eplee et al. |
| 2007/0101862 A1 | 5/2007 | Tongue |
| 2007/0150424 A1 | 6/2007 | Igelnik |
| 2007/0274858 A1 | 11/2007 | Childers et al. |
| 2007/0295021 A1 | 12/2007 | Tyls et al. |
| 2008/0022694 A1 | 1/2008 | Anderson et al. |
| 2008/0135495 A1 | 6/2008 | Sher |
| 2008/0168789 A1 | 7/2008 | Jones |
| 2008/0202944 A1 | 8/2008 | Santoli et al. |
| 2008/0224652 A1 | 9/2008 | Zhu et al. |
| 2008/0245092 A1 | 10/2008 | Forsberg et al. |
| 2008/0289352 A1 | 11/2008 | Parent |
| 2009/0025711 A1 | 1/2009 | Edwards et al. |
| 2009/0093916 A1 | 4/2009 | Parsonnet et al. |
| 2009/0173376 A1 | 7/2009 | Spencer et al. |
| 2009/0211276 A1 | 8/2009 | Forkosh |
| 2009/0223236 A1 | 9/2009 | Call et al. |
| 2009/0223514 A1 | 9/2009 | Smith et al. |
| 2009/0283464 A1 | 11/2009 | Oe et al. |
| 2010/0083673 A1 | 4/2010 | Meritt |
| 2010/0170499 A1 | 7/2010 | Bar |
| 2010/0192605 A1 | 8/2010 | Fang et al. |
| 2010/0212348 A1 | 8/2010 | Oh |
| 2010/0242507 A1 | 9/2010 | Meckler |
| 2010/0275629 A1 | 11/2010 | Erickson |

(56) References Cited

U.S. PATENT DOCUMENTS

| | | | |
|---|---|---|---|
| 2010/0275775 A1 | 11/2010 | Griffiths et al. | |
| 2010/0294672 A1 | 11/2010 | Gahr et al. | |
| 2010/0300868 A1 | 12/2010 | Pirone | |
| 2011/0048039 A1 | 3/2011 | Kohavi et al. | |
| 2011/0056220 A1 | 3/2011 | Caggiano | |
| 2011/0083458 A1 | 4/2011 | Takakura et al. | |
| 2011/0132027 A1 | 6/2011 | Gommed et al. | |
| 2011/0232485 A1 | 9/2011 | Ellsworth | |
| 2011/0247353 A1 | 10/2011 | Metz | |
| 2011/0296858 A1 | 12/2011 | Caggiano | |
| 2012/0006193 A1 | 1/2012 | Roychoudhury | |
| 2012/0125020 A1 | 5/2012 | Vandermeulen et al. | |
| 2012/0144828 A1* | 6/2012 | Lazaris | H02J 3/381 60/641.1 |
| 2012/0227582 A1 | 9/2012 | Wamstad et al. | |
| 2013/0042642 A1 | 2/2013 | Ferreira et al. | |
| 2013/0227879 A1 | 9/2013 | Lehky | |
| 2013/0269522 A1 | 10/2013 | DeValve | |
| 2013/0312451 A1 | 11/2013 | Max | |
| 2013/0318790 A1 | 12/2013 | Becze et al. | |
| 2013/0319022 A1 | 12/2013 | Becze et al. | |
| 2014/0034475 A1 | 2/2014 | Kamen et al. | |
| 2014/0053580 A1 | 2/2014 | Ferreira et al. | |
| 2014/0110273 A1 | 4/2014 | Bar-or et al. | |
| 2014/0138236 A1 | 5/2014 | White | |
| 2014/0157985 A1 | 6/2014 | Scovazzo et al. | |
| 2014/0173769 A1 | 6/2014 | Leyns | |
| 2014/0260389 A1 | 9/2014 | Sistla | |
| 2014/0317029 A1 | 10/2014 | Matsuoka et al. | |
| 2015/0033774 A1 | 2/2015 | Ferreira et al. | |
| 2015/0136666 A1 | 5/2015 | Zamir et al. | |
| 2015/0194926 A1 | 7/2015 | Bushong, Jr. | |
| 2016/0073589 A1 | 3/2016 | McNamara | |
| 2016/0131401 A1 | 5/2016 | Otanicar et al. | |
| 2016/0162456 A1 | 6/2016 | Munro et al. | |
| 2016/0187287 A1 | 6/2016 | Tajiri et al. | |
| 2016/0197364 A1 | 7/2016 | Rama | |
| 2016/0209346 A1 | 7/2016 | Brondum et al. | |
| 2016/0244951 A1 | 8/2016 | Yui | |
| 2016/0333553 A1 | 11/2016 | Dorfman | |
| 2017/0013810 A1 | 1/2017 | Grabell | |
| 2017/0024641 A1 | 1/2017 | Wierzynski | |
| 2017/0203974 A1 | 7/2017 | Riedl et al. | |
| 2017/0241110 A1* | 8/2017 | West | B01D 5/0012 |
| 2017/0323221 A1 | 11/2017 | Chaudhuri et al. | |
| 2017/0354920 A1 | 12/2017 | Friesen et al. | |
| 2017/0371544 A1 | 12/2017 | Choi et al. | |
| 2018/0029903 A1* | 2/2018 | Ng | F24F 8/10 |
| 2018/0043295 A1 | 2/2018 | Friesen et al. | |
| 2018/0209123 A1 | 7/2018 | Bahrami et al. | |
| 2019/0025273 A1 | 1/2019 | Brondum | |
| 2019/0102695 A1 | 4/2019 | Biswas et al. | |
| 2019/0171967 A1 | 6/2019 | Friesen et al. | |
| 2019/0254243 A1 | 8/2019 | Friesen et al. | |
| 2019/0336907 A1 | 11/2019 | Friesen et al. | |
| 2019/0344214 A1 | 11/2019 | Friesen et al. | |
| 2019/0372520 A1 | 12/2019 | Friesen et al. | |
| 2020/0049682 A1 | 2/2020 | Fukuzawa et al. | |
| 2020/0055753 A1 | 2/2020 | Minor et al. | |
| 2020/0108344 A1 | 4/2020 | Vollmer et al. | |
| 2020/0122083 A1 | 4/2020 | Friesen et al. | |
| 2020/0124566 A1 | 4/2020 | Johnson et al. | |
| 2020/0140299 A1 | 5/2020 | Friesen et al. | |
| 2020/0209190 A1 | 7/2020 | Johnson et al. | |
| 2020/0269184 A1 | 8/2020 | Friesen et al. | |
| 2020/0283997 A1 | 9/2020 | Salloum et al. | |
| 2020/0286997 A1 | 9/2020 | Wu et al. | |
| 2020/0300128 A1 | 9/2020 | Friesen et al. | |
| 2020/0361965 A1 | 11/2020 | Yaghi et al. | |
| 2021/0062478 A1 | 3/2021 | Friesen et al. | |
| 2021/0300804 A1 | 9/2021 | Broga et al. | |
| 2021/0305935 A1 | 9/2021 | Friesen et al. | |
| 2022/0039341 A1 | 2/2022 | Friesen et al. | |
| 2022/0127172 A1 | 4/2022 | Friesen et al. | |
| 2022/0136270 A1 | 5/2022 | Gamboa et al. | |
| 2022/0156648 A1 | 5/2022 | Friesen et al. | |
| 2022/0176314 A1 | 6/2022 | Friesen et al. | |
| 2022/0228351 A1 | 7/2022 | Friesen et al. | |
| 2022/0259838 A1 | 8/2022 | Friesen et al. | |
| 2022/0274048 A1 | 9/2022 | Friesen et al. | |
| 2022/0307240 A1 | 9/2022 | Friesen et al. | |
| 2022/0316192 A1 | 10/2022 | Friesen et al. | |
| 2022/0341134 A1 | 10/2022 | Friesen et al. | |
| 2022/0411297 A1 | 12/2022 | Friesen et al. | |
| 2023/0014032 A1 | 1/2023 | Friesen et al. | |
| 2023/0078132 A1 | 3/2023 | Friesen et al. | |
| 2023/0113840 A1 | 4/2023 | Friesen et al. | |
| 2023/0130872 A1 | 4/2023 | Friesen et al. | |

FOREIGN PATENT DOCUMENTS

| | | | |
|---|---|---|---|
| CN | 1774401 | | 5/2006 |
| CN | 101589282 | | 11/2009 |
| CN | 102042645 | | 5/2011 |
| CN | 102297503 | | 12/2011 |
| CN | 102422089 | | 4/2012 |
| CN | 102441320 | | 5/2012 |
| CN | 102733451 | | 10/2012 |
| CN | 202850099 | | 4/2013 |
| CN | 103889892 | | 6/2014 |
| CN | 203777907 | | 8/2014 |
| CN | 104420501 A | * | 3/2015 |
| CN | 104813107 | | 7/2015 |
| CN | 204510348 U | | 7/2015 |
| CN | 105531547 | | 4/2016 |
| CN | 107447811 | | 12/2017 |
| DE | 4215839 | | 11/1993 |
| EP | 1139554 | | 10/2001 |
| EP | 2305362 | | 4/2011 |
| EP | 2326890 | | 6/2011 |
| FR | 2813087 | | 2/2002 |
| GB | 2237387 | | 5/1991 |
| JP | H06142434 | | 5/1994 |
| JP | H09-285412 | | 11/1997 |
| JP | 2002-126441 | | 5/2002 |
| JP | 2003-148786 | | 5/2003 |
| JP | 2004-239541 | | 8/2004 |
| JP | 3850498 | | 11/2006 |
| JP | 2012101169 | | 5/2012 |
| KR | 20000003525 | | 2/2000 |
| WO | 1999007951 | | 2/1999 |
| WO | 2006129200 | | 12/2006 |
| WO | 2007041804 | | 4/2007 |
| WO | 2007051886 | | 5/2007 |
| WO | 2008018071 | | 2/2008 |
| WO | 2009043413 | | 4/2009 |
| WO | 2012009024 | | 1/2012 |
| WO | 2012128619 | | 9/2012 |
| WO | 2012162760 | | 12/2012 |
| WO | 2013026126 | | 2/2013 |
| WO | 2013182911 | | 12/2013 |
| WO | 2014085860 | | 6/2014 |
| WO | 2015054435 | | 4/2015 |
| WO | 2016053162 | | 4/2016 |
| WO | 2016081863 | | 5/2016 |
| WO | 2016138075 | | 9/2016 |
| WO | 2016187709 | | 12/2016 |
| WO | 2017177143 | | 10/2017 |
| WO | 2017201405 | | 11/2017 |
| WO | 2018013161 | | 1/2018 |
| WO | 2019014599 | | 1/2019 |
| WO | 2019050861 | | 3/2019 |
| WO | 2019050866 | | 3/2019 |
| WO | 2019071202 | | 4/2019 |
| WO | 2019113354 | | 6/2019 |
| WO | 2019161339 | | 8/2019 |
| WO | 2019217974 | | 11/2019 |
| WO | 2020082038 | | 4/2020 |
| WO | 2020086621 | | 4/2020 |
| WO | 2020219604 | | 4/2020 |
| WO | 2021154739 | | 8/2021 |

(56) References Cited

FOREIGN PATENT DOCUMENTS

| | | |
|---|---|---|
| WO | 2022093999 | 5/2022 |
| WO | 2023059834 | 4/2023 |

OTHER PUBLICATIONS

Non-Final Office Action dated Jan. 17, 2020 in U.S. Appl. No. 15/528,366.
Final Office Action dated Apr. 27, 2020 in U.S. Appl. No. 15/528,366.
Notice of Allowance dated Jun. 19, 2020 in U.S. Appl. No. 15/528,366.
Notice of Allowance dated Jun. 3, 2019 in U.S. Appl. No. 15/600,046.
Non-Final Office Action dated Feb. 5, 2019 in U.S. Appl. No. 15/482,104.
Notice of Allowance dated Jun. 27, 2019 in U.S. Appl. No. 15/482,104.
Non-Final Office Action dated Jun. 1, 2020 in U.S. Appl. No. 16/167,295.
Final Office Action dated Apr. 13, 2021 in U.S. Appl. No. 16/167,295.
Non-Final Office Action dated Apr. 30, 2021 in U.S. Appl. No. 16/278,608.
Non-Final Office Action dated Jul. 20, 2021 in U.S. Appl. No. 16/211,896.
Notice of Allowance dated Nov. 10, 2021 in U.S. Appl. No. 16/211,896.
Non-Final Office Action dated May 11, 2022 in U.S. Appl. No. 16/411,048.
Notice of Allowance dated Oct. 20, 2022 in U.S. Appl. No. 16/411,048.
Non-Final Office Action dated Aug. 9, 2019 in U.S. Appl. No. 16/517,435.
Notice of Allowance dated Jan. 31, 2020 in U.S. Appl. No. 16/517,435.
Non-Final Office Action dated Jul. 26, 2021 in U.S. Appl. No. 16/630,824.
Final Office Action dated Jan. 11, 2022 in U.S. Appl. No. 16/630,824.
Non-Final Office Action dated Mar. 2, 2022 in U.S. Appl. No. 16/630,824.
Notice of Allowance dated Aug. 3, 2022 in U.S. Appl. No. 16/630,824.
Notice of Allowance dated Feb. 4, 2022 in U.S. Appl. No. 16/644,465.
Notice of Allowance dated Mar. 7, 2022 in U.S. Appl. No. 16/644,487.
Non-Final Office Action dated Aug. 24, 2021 in U.S. Appl. No. 16/657,935.
Non-Final Office Action dated Apr. 12, 2022 in U.S. Appl. No. 16/753,560.
Notice of Allowance dated Sep. 14, 2022 in U.S. Appl. No. 16/753,560.
Non-Final Office Action dated May 15, 2020 in U.S. Appl. No. 16/791,895.
Final Office Action dated Oct. 15, 2020 in U.S. Appl. No. 16/791,895.
Non-Final Office Action dated Jun. 8, 2021 in U.S. Appl. No. 16/791,895.
Final Office Action dated Dec. 20, 2021 in U.S. Appl. No. 16/791,895.
Non Final Office Action dated Jun. 24, 2022 in U.S. Appl. No. 16/791,895.
Notice of Allowance dated Oct. 20, 2021 in U.S. Appl. No. 16/820,587.
Non-Final Office Action dated May 6, 2022 in U.S. Appl. No. 16/855,965.
Non-Final Office Action dated Sep. 15, 2022 in U.S. Appl. No. 17/081,898.
Notice of Allowance dated Sep. 15, 2022 in U.S. Appl. No. 17/081,898.
Office Action dated Apr. 10, 2023 in U.S. Appl. No. 17/859,971.
Non-Final Office Action dated Mar. 2, 2023 in U.S. Appl. No. 17/899,416.
Non-Final Office Action dated Mar. 29, 2023 in U.S. Appl. No. 17/832,977.
International Search Report and Written Opinion dated Apr. 29, 2016 in Application No. PCT/US2015/061921.
International Search Report and Written Opinion in Aug. 16, 2017 in Application No. PCT/US2017/033540.
International Search Report and Written Opinion dated Jun. 19, 2017 in Application No. PCT/US2017/026609.
International Search Report and Written Opinion dated Dec. 3, 2018 in Application No. PCT/US2018/049411.
International Search Report and Written Opinion dated Dec. 3, 2018. Application No. PCT/US2018/049398.
International Search Report and Written Opinion dated Jan. 15, 2019 in Application No. PCT/US2018/054715.
International Search Report and Written Opinion dated Mar. 6, 2019 in Application No. PCT/US2018/042098.
International Search Report and Written Opinion dated Mar. 29, 2019 in Application No. PCT/US2018/064308.
International Search Report and Written Opinion dated Jun. 6, 2019 in Application No. PCT/US2019/018431.
International Search Report and Written Opinion dated Jul. 29, 2019 in Application No. PCT/US2019/32066.
International Search Report and Written Opinion dated Jan. 28, 2020 in Application No. PCT/US2019/057492.
International Search Report and Written Opinion dated Mar. 19, 2020 in Application No. PCT/US2019/057081.
International Search Report and Written Opinion dated Jun. 15, 2020 in Application No. PCT/US2020/029401.
International Search Report and Written Opinion dated Apr. 6, 2021 in Application No. PCT/US2021/015106.
International Search Report and Written Opinion dated Feb. 16, 2022 in Application No. PCT/US2021/056910.
International Search Report and Written Opinion dated May 11, 2022 in Application No. PCT/US2022/0)12909.
European Search Report dated Jun. 7, 2019 in European Application No. 15825979.
European Search Report dated Jan. 28, 2020 in European Application No. 15825979.
Office Action dated Oct. 31, 2019 in Chinese Application No. 201780033378.3.
Office Action dated Apr. 6, 2021 in Chinese Application No. 201780033378.3.
Office Action dated Aug. 4, 2021 in Chinese Application No. 201780033378.3.
Office Action dated Nov. 1, 2021 in Chinese Application No. 201780033378.3.
Office Action dated Feb. 4, 2020 in Brazilian Patent Application No. 112017021842.9.
Office Action dated Jul. 15, 2021 in Japanese Patent Application No. 2019-503636.
Office Action dated Apr. 28, 2021 in India Patent Application No. 20181704169.
Office Action dated Jul. 29, 2021 in India Patent Application No. 202017005710.
Office Action dated Mar. 1, 2022 in India Patent Application No. 202017014752.
Office Action dated Oct. 31, 2022 in India Patent Application No. 202117022077.
Office Action dated Mar. 6, 2023 in India Patent Application No. 202017037089.
Office Action dated May 5, 2023 in Chinese Patent Application No. 201780044144.9.
Ali et al., "Desiccant Enhanced Nocturnal Radiative Cooling-Solar Collector System for Air Comfort Application in Hot Arid Areas," Int. J. of Thermal & Environmental Engineering, vol. 5, No. 1, pp. 71-82 (2013).
Anand et al., "Solar Cooling Systems for Climate Change Mitigation: A Review," Renewable and Sustainable Energy Reviews, vol. 41, pp. 143-161 (2015).
De Antonellis et al., "Simulation, Performance Analysis and Optimization of Desiccant Wheels," Energy and Buildings, vol. 42, No. 9, pp. 1386-1393 (2010).
Eriksson et al., "Diurnal Variations of Humidity and Ice Water Content in the Tropical Upper Troposphere," Atmos. Chem. Phys,. vol. 10, pp. 11519-11533 (2010).

(56) References Cited

OTHER PUBLICATIONS

European Solar Thermal Industry Federation (ESTIF), "Key Issues for Renewable Heat in Europe (K4RES-H)," Solar Assisted Cooling-WP3, Task 3.5, Contract EIE/04/204/S07.38607, pp. 1-21 (2006).
Ge et al., "A Mathematical Model for Predicting the Performance of a Compound Desiccant Wheel (A Model of a Compound Desiccant Wheel)," Applied Thermal Engineering, vol. 30, No. 8, pp. 1005-1015 (2010).
Kassem et al., "Solar Powered Dehumidification Systems Using Desert Evaporative Coolers: Review," International Journal of Engineering and Advanced Technology {IJEAT), ISSN: 2249-8958, vol. 3, Issue 1 (2013).
Kolewar et al., "Feasability of Solar Desiccant Evaporative Cooling: A Review," International Journal of Scientific & Engineering Research, ISSN: 2229-5518, vol. 5, Issue 10 (2014).
La et al., "Technical Development of Rotary Desiccant Dehumidification and Air Conditioning: A Review," Renewable and Sustainable Energy Reviews, vol. 14, pp. 130-147 (2010).
Nia et al., "Modeling and Simulation of Desiccant Wheel for Air Conditioning," Energy and Buildings, vol. 38, No. 10, pp. 1230-1239 (2006).
Kozubal et al., "Desiccant Enhanced Evaporative Air-Conditioning {DEVap): Evaluation of a New Concept in Ultra Efficient Air Conditioning," National Renewal Energy Laboratory {NREL), Technical Report, NREL/TP-5500-49722 (2011).
Critoph et al., "Solar Energy for Cooling and Refrigeration," Engineering Department, University of Warwick, Coventry CV4 7AL, United Kingdom (1997).
Wahlgren, "Atmospheric Water Vapour Processor Designs for Potable Water Production: A Review," Wat. Res., vol. 35, No. 1, pp. 1-22 (2001).
Gad et al., "Application of a Solar Desiccant/Collector System for Water Recovery From Atmospheric Air," Renewal Energy, vol. 22, No. 4, pp. 541-556 (2001).
William et al., "Desiccant System for Water Production From Humid Air Using Solar Energy," Energy, vol. 90, pp. 1707-1720 (2015).
PV Performance Modeling Collaborative. (2014). Irradiance & Insolation. Accessed Aug. 18, 2021 at https://pvpmc.sandia.gov/modeling-steps/1-weather-design-inputs/irradiance-and-insolation-2/ (Year: 2014).
ACS. (2012). A Single-Layer Atmosphere Model. Accessed on Aug. 17, 2021 at https://www.acs.org/content/acs/en/climatescience/atmosphericwarming/singlelayermodel.html (Year: 2012).
Materials Technology. (2010). UV Exposure Across Surface of Earth. Accessed Aug. 17, 2021 at http://www.drb-mattech.co.uk/uv%20map.html (Year: 2010).

\* cited by examiner

300

302
Establishing a wireless mesh communications network

304
Control a production rate of liquid water from air based operational parameters for water production

306
Determine operational parameters for water distribution

308
Transmit operational parameters for water distribution across the wireless mesh network

310
Transfer volume of liquid water from local reservoir to central reservoir via liquid water conduit

FIG. 7

SYSTEMS AND METHODS FOR MANAGING PRODUCTION AND DISTRIBUTION OF LIQUID WATER EXTRACTED FROM AIR

CROSS-REFERENCE TO RELATED APPLICATIONS

This application is a continuation of U.S. patent application Ser. No. 16/644,465 filed on Mar. 4, 2020 entitled, "SYSTEMS AND METHODS FOR MANAGING PRODUCTION AND DISTRIBUTION OF LIQUID WATER EXTRACTED FROM AIR," which is a U.S. national phase filing under 35 U.S.C. § 371 of PCT/US2018/049411 filed on Sep. 4, 2018 entitled "SYSTEMS AND METHODS FOR MANAGING PRODUCTION AND DISTRIBUTION OF LIQUID WATER EXTRACTED FROM AIR," which claims priority to U.S. Provisional Patent Application No. 62/554,176 filed on Sep. 5, 2017 entitled "SYSTEMS AND METHODS FOR MANAGING PRODUCTION AND DISTRIBUTION OF LIQUID WATER EXTRACTED FROM AIR." The contents of the above-identified applications are herein incorporated by reference in their entirety.

TECHNICAL FIELD

The present disclosure is related to techniques for managing the production and distribution of liquid water extracted from ambient air.

BACKGROUND

The extraction of liquid water from ambient air or atmospheric air can present various challenges. Certain challenges include those associated with managing the production and distribution of the water at low costs and with high reliability. There exists a need for improved systems and methods for extracting water vapor from ambient air or atmospheric air using an inexpensive and reliable approach to maintain water production efficiency.

BRIEF DESCRIPTION OF THE DRAWINGS

To facilitate further description of the embodiments, the following drawings are provided in which:

FIG. 7 depicts a method for managing production and distribution of liquid water extracted from ambient air according to an embodiment;

DETAILED DESCRIPTION

Figure 1:
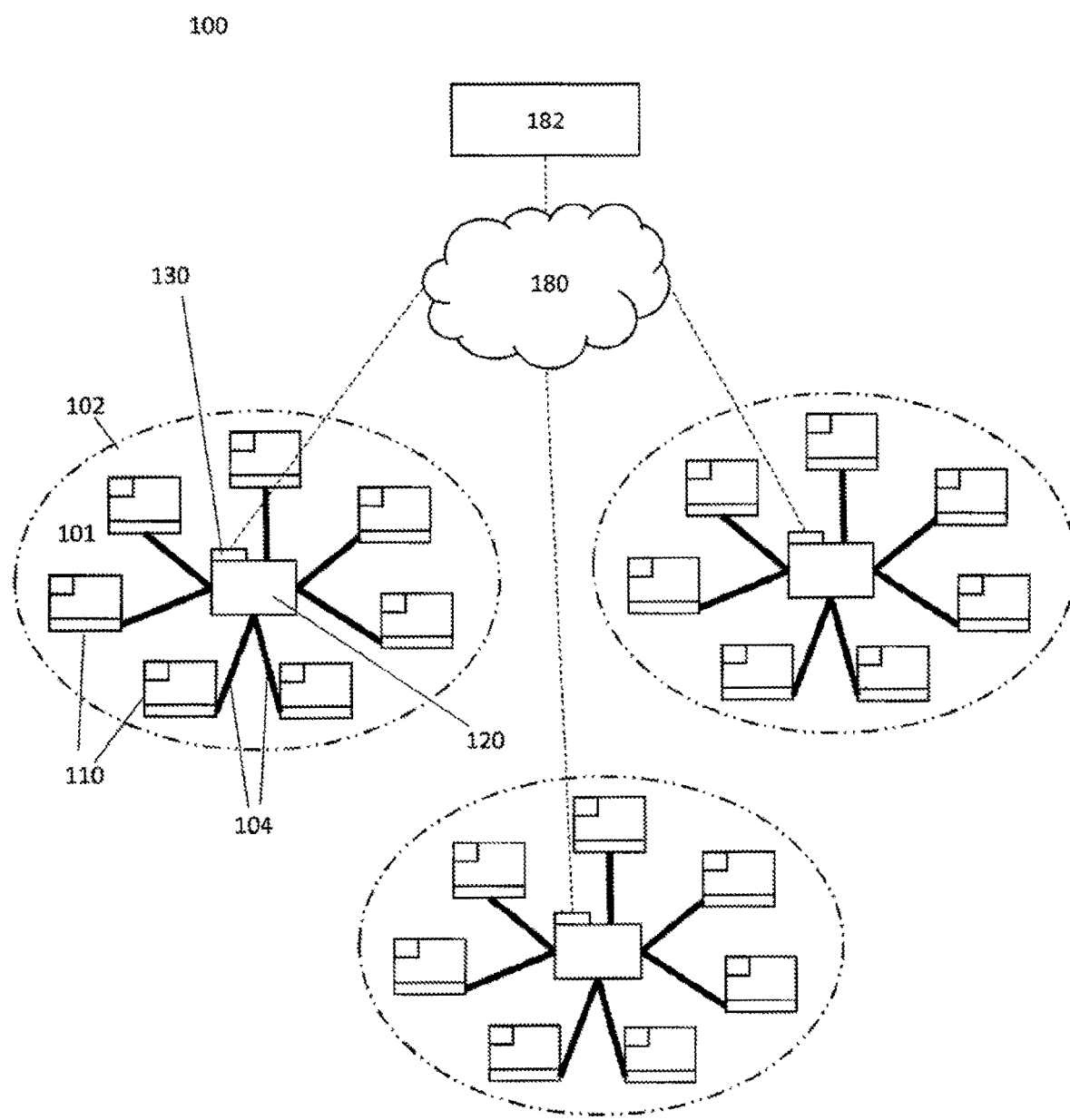
FIG. 1 is a diagram of a system for managing production and distribution of liquid water extracted from ambient air according to an embodiment.

For simplicity and clarity of illustration, the drawing figures illustrate the general manner of construction, and descriptions and details of well-known features and techniques can be omitted to avoid unnecessarily obscuring the invention. Additionally, elements in the drawing figures are not necessarily drawn to scale. For example, the dimensions of some of the elements in the figures can be exaggerated relative to other elements to help improve understanding of embodiments of the present invention. Identical reference numbers do not necessarily indicate an identical structure.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but can include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements can be electrically coupled together, but not be mechanically or otherwise coupled together; two or more mechanical elements can be mechanically coupled together, but not be electrically or otherwise coupled together; two or more electrical elements can be mechanically coupled together, but not be electrically or otherwise coupled together. Coupling can be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

The absence of the word "removably," "removable," and the like near the word "coupled," and the like does not mean that the coupling, etc. in question is or is not removable.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

In accordance with certain embodiments, a system is disclosed for managing production and distribution of liquid water extracted from air by a plurality of local water generation units. The system comprises the plurality of local water generation units arranged in an array, the plurality of local water generation units are located in a first water management area, the plurality of local water generation units comprise a first local water generation unit and a second local water generation unit, the first local water generation unit comprises: a first local controller configured to control a first production rate of first liquid water extracted from the air by the first water generation unit based on one or more operational parameters for water production; a first local water collection unit configured to store the first liquid water; and a first local transceiver configured to communicate with the first local controller and a second local transceiver of the second local water generation unit; and the second local water generation unit comprises: a second local controller configured to control a second production rate of second liquid water extracted from the air by the second water generation unit based on the one or more operational parameters for water production; a second local water collection unit configured to store the second liquid water; and the second local transceiver, the second local transceiver being configured to communicate with the second local controller and the first local transceiver of the first local water generation unit. The system further comprises a principal water supply unit in fluid communication with at least one of the first local water collection unit or the second local water collection unit via at least one liquid water conduit, wherein the principal water supply unit is configured to store at least part of the liquid water extracted from the air by the plurality of water generation units, at least one of the first local controller, the second local controller, or the principal water supply unit is configured to maintain a principal water level a reservoir of the principal water supply unit based on one or more operational parameters for water distribution, and the principal water supply unit comprises: a reservoir dispenser being configured to dispense the at least part of the liquid water therefrom; and a reservoir transceiver. The system further comprises an array communications unit comprising: a network manager comprising an array transceiver configured to wirelessly communicate with at least one of the first local transceiver or the second local transceiver and the reservoir transceiver through a wireless mesh communications network, wherein the one or more operational parameters for water production and the one or more operational parameters for water distribution are communicated through the wireless mesh communications network.

In accordance with certain embodiments, another system is disclosed for managing production and distribution of liquid water extracted from air by a plurality of local water generation units. The system comprises the plurality of local water generation units arranged in an array, the plurality of local water generation units are located in a first water management area, the plurality of local water generation units comprise a first local water generation unit and a second local water generation unit, the first local water generation unit comprises: a first local controller configured to control a first production rate of first liquid water extracted from the air by the first water generation unit based on one or more operational parameters for water production; a first local controller configured to control a first production rate of first liquid water extracted from the air by the first water generation unit based on one or more operational parameters for water production; a first local water collection unit configured to store the first liquid water; and a first local transceiver configured to communicate with the first local controller and a second local transceiver of the second local water generation unit; and the second local water generation unit comprises: a second local controller configured to control a second production rate of second liquid water extracted from the air by the second water generation unit based on the one or more operational parameters for water production; a second local water collection unit configured to store the second liquid water; and the second local transceiver, the second local transceiver being configured to communicate with the second local controller and the first local transceiver of the first local water generation unit. The system further comprises a principal water supply unit in fluid communication with at least one of the first local water collection unit or the second local water collection unit via at least one liquid water conduit, wherein the principal water supply unit is configured to store at least part of the liquid water extracted from the air by the plurality of water generation units, and the principal water supply unit comprises: a reservoir dispenser being configured to dispense the at least part of the liquid water therefrom; and a reservoir transceiver. The system further comprises: an array communications unit comprising: a network manager comprising an array transceiver configured to wirelessly communicate with at least one of the first local transceiver or the second local transceiver and the reservoir transceiver through a wireless mesh communications network, wherein the one or more operational parameters for water production are communicated through the wireless mesh communications network.

In accordance with certain embodiments, a method is disclosed for operating a system for production and distribution of liquid water extracted from air by a plurality of local water generation units. The system includes the plurality of local water generation units, wherein the plurality of local water generation units are arranged in an array, the plurality of local water generation units are located in a first water management area, the plurality of local water generation units comprise a first local water generation unit and a second local water generation unit, the first local water generation unit comprises: a first local controller; a first local water collection unit configured to store first liquid water extracted from the air by the first water generation unit; and a first local transceiver configured to communicate with the first local controller and a second local transceiver of the second local water generation unit; and the second local water generation unit comprises: a second local controller; a second local water collection unit configured to store second liquid water extracted from the air by the second water generation unit; and the second local transceiver, the second local transceiver being configured to communicate with the second local controller and the first local transceiver of the first local water generation unit; a principal water supply unit in fluid communication with at least one of the first local water collection unit or the second local water collection unit via at least one liquid water conduit, wherein the principal water supply unit is configured to store at least part of the liquid water extracted from the air by the plurality of water generation units, and the principal water supply unit comprises: a reservoir dispenser being configured to dispense the at least part of the liquid water therefrom; and a reservoir transceiver; and an array communications unit comprising: a network manager comprising an array transceiver configured to wirelessly communicate with at least one of the first local transceiver or the second local transceiver and the reservoir transceiver through a wireless mesh communications network. The method comprises: establishing the wireless mesh communications network; at least one of: (i) controlling, by the first local controller, a production rate of the first liquid water based on one or more operational parameters for water production; or (ii) controlling, by the second local controller, a production rate of the second liquid water based on the one or more operational parameters for water production; determining one or more operational parameters for water distribution; transmitting the one or more operational parameters for water distribution to at least one of the first local controller or the second local controller through the wireless mesh communications network; and at least one of: (i) transferring, via the at least one water conduit, a volume of the first liquid water to the principal water supply unit from the first local water collection unit; or (ii) transferring, via the at least one water conduit, a volume of the second liquid water to the principal water supply unit from the second local water collection unit.

Managing production and distribution of liquid water extracted from ambient air can be challenging in terms of maintaining water production efficiency at a low cost and high reliability. For example, systems for extracting water from air can comprise a thermal unit, one or more rotating desiccant wheels, and a regeneration fluid path for extracting water collected from the desiccant. Water-from-air systems can employ a controller to continuously maintain a high water extraction efficiency regardless of changes in ambient conditions dependent on physical location. There exists a need for improved systems and methods for the extraction of water vapor from atmospheric air. In particular, there is a need for an inexpensive and reliable approach to maintain water production efficiency of a network of water-from-air generation devices. Accordingly, systems and methods for managing production and distribution of liquid water extracted from ambient air are described herein. Furthermore, systems and methods for optimizing production of liquid water from air including communicating operational parameters for water production, distribution and management are described herein.

Turning to the drawings, FIG. 1 depicts a system 100 for managing production and distribution of liquid water extracted from ambient air, according to an embodiment. System 100 comprises a plurality of water production or generation units 110 arranged into a configuration, network, or array 101. The array 101 can be located in or spread across a water management area 102. The array 101 further can comprise a hub or principal water supply unit 120 for storing and/or dispensing liquid water collected from air. The water generation units 110 can be in fluid communication with the principal water supply unit 120 via liquid water conduits 104.

In some embodiments, principal water supply unit 120 can be similar or identical to one of water generation units 110. In further embodiments, part of principal water supply unit 120 can be different than part of one or more of water generation units 110. Meanwhile, in some embodiments, each of water generation units 110 can be similar or identical to each other. In other embodiments, part of one or more of water generation units 110 can be different than part of one or more others of water generation units 110.

In some embodiments, water generation units 110 can be referred to as "local" or "spoke" water generation units. In these or other embodiments, the principal water supply unit 120 can be referred to as a principal water reservoir unit.

The system 100 further can comprise an array communications unit 130. As depicted in FIG. 1, the array communications unit 130 can be physically located at or near the principal water supply unit 120. However, in other embodiments, the array communications unit 130 can be physically separate from the principal water supply unit 120, such as, for example, associated with another water generation unit, or be provided as a standalone unit. As described in more detail below, the array communications network 130 can establish a wireless mesh communications network comprising the water generation units 110 and the principal water supply unit 120. The array communications unit 130 further can communicate across a communications channel 180 (e.g. a cloud network, a local area network, Internet, etc.) so as to transmit operational parameters for water production and distribution to and from a water management host unit 182 (e.g. a control center comprising a host computer including a processor, database and user interface).

Array 101 can be implemented in any desirable configuration across a water management area. The configuration of array 101 can include a radial, semi-radial or "hub-and-spoke" type of configuration wherein water generation units 110 are connected via water conduits 104 to a physically central water reservoir unit 120, such as depicted in FIG. 1. In other embodiments, array 101 can be implemented in a more linear or "daisy-chain" type of configuration wherein water generation units 110 are connected via a system of water conduits in a linear or semi-linear configuration to a principal water supply unit not physically central to water generation units 110 within a particular water management area. The particular configuration of array 101 can be selected based on water management area properties including but not limited to historical and/or expected ambient conditions within the water management area, building or structures within the water management area, populations within the water management area, and so on.

Figure 2:
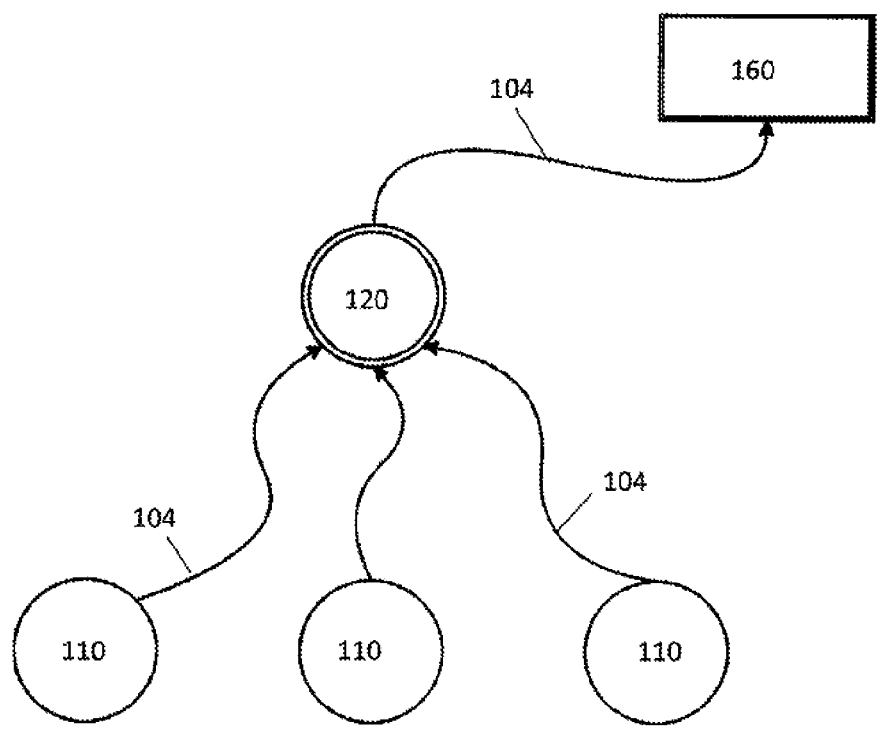
FIG. 2 is a diagram of an exemplary array of water generation units according to an embodiment.

Turning to the next drawing, FIG. 2 depicts an array 101 of water generation units 110 and a principal water supply unit 120. In some embodiments, the array 101 can be similar or identical to the array 101 of FIG. 1, the water generation units 110 can be similar or identical to the water generation units 110 of FIG. 1, and the principal water supply unit 120 can be similar or identical to the principal water supply unit 120 of FIG. 1.

The array 101 further can comprise a water dispenser 160 for dispensing water generated by local water generation units 110 and/or principal water supply unit 120. The water generation units 110 can be in fluid communication with the principal water supply unit 120 and dispenser 160 via liquid water conduits 104. As depicted in the example of FIG. 2, the local water generation units 110 are in fluid communication with the principal water supply unit 120 which is in turn in fluid communication with the dispenser 160. However, in other embodiments, other configurations can be implemented. The spoke or local water generation units 110 can distribute generated water from an associated local reservoir to a reservoir associated with the hub or principal water supply unit 120. The hub or principal water supply unit 120 can in turn distribute water to the water dispenser 160. In an embodiment, the array 101 can be identified with a Universally Unique Identifier (UUID) created by water management host 182 which can configure one or more of water generation units 110 and/or principal water supply unit 120 in array 101 with an Array UUID.

Figure 3:
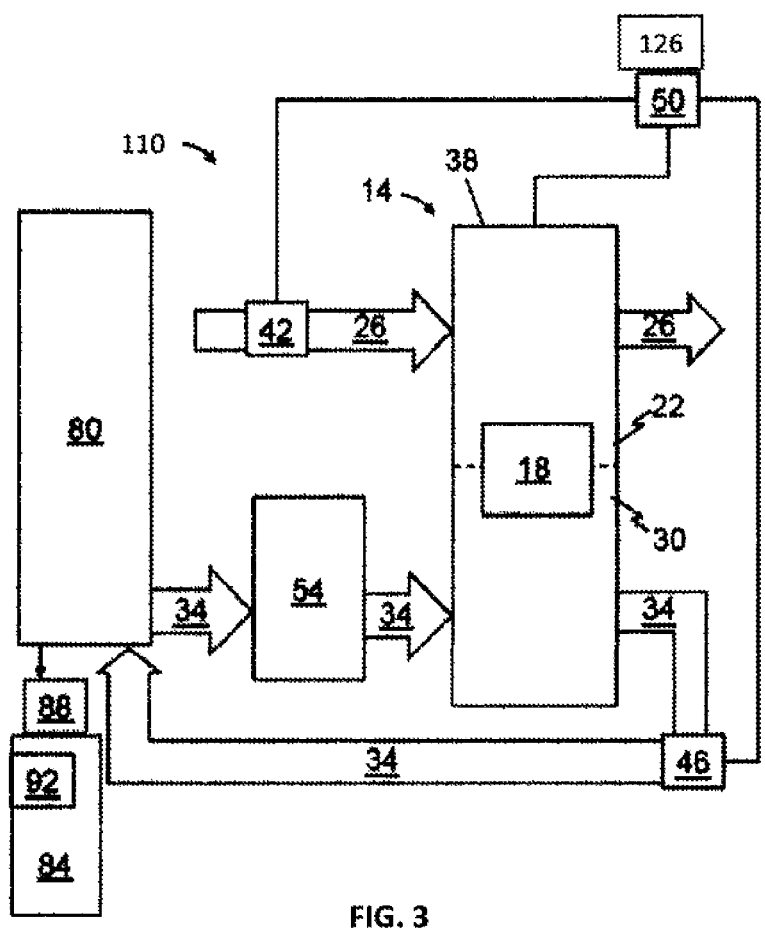
FIG. 3 is a diagram of a system for generating liquid water from air according to an embodiment.

Turning to the next drawing, FIG. 3 depicts an example of a water generation unit 110 for generating liquid water from air. In some embodiments, water generation unit 110 can be similar or identical to one of the water generation units 110 of FIG. 1 and/or the water generation units 110 of FIG. 2. In further embodiments, water generation unit 110 can be similar or identical to the principal water supply unit 120 of FIG. 1 and/or the principal water supply unit 120 of FIG. 2.

Water generation unit 110 can be configured to function responsive to diurnal variations. For example, as described in more detail below, water generation unit 110 can be configured to control one or more operational parameters (e.g., control and/or controlled variables) based on one or more diurnal variations (e.g., variations in ambient air temperature, ambient air relative humidity, solar insolation, and/or the like).

Water generation unit 110 can comprise a desiccant unit 14. Desiccant unit 14 can comprise a desiccant 18, where the desiccant 18 (e.g., or a portion thereof) can be selectively (e.g., and/or alternatively) movable between an adsorption zone 22, in which the desiccant is in fluid communication with a process air pathway (e.g., a process airflow path) 26 and a desorption zone 30, in which the desiccant is in fluid communication with a (e.g., closed-loop) regeneration fluid pathway (e.g., a regeneration fluid path) 34. In some embodiments, the adsorption and desorption zones can be defined by a housing (e.g., 38) of the desiccant unit. In further embodiments, the desiccant 18 can comprise a sorption medium.

Desiccant unit 14 can operate in a continuous, or non-batch, fashion, such that desiccant unit 14 is configured to absorb water and desorb water substantially simultaneously or simultaneously. For example, water generation unit 110 can be configured such that a first portion of desiccant 18 can be disposed within adsorption zone 22 (e.g., such that the first portion can capture water from process air in process air pathway 26), and a second portion of desiccant 18 can be simultaneously disposed within the desorption zone (e.g., such that the second portion can desorb water into regeneration fluid in regeneration fluid pathway 34). In many embodiments, exemplary regeneration fluids can include, but are not limited to, air (e.g., including any suitable amount of water vapor), super-saturated or high relative humidity gas (e.g., 90-100% relative humidity), glycols, ionic liquids, and/or the like.

Desiccant unit 14 and/or desiccant 18 can comprise a hygroscopic material configured to continuously alternate between a process air pathway 26 and a regeneration fluid pathway 34. In some embodiments, desiccant 18 can be capable of quickly desorbing water back into low relative humidity air (e.g., to regenerate the desiccant). Therefore, in some embodiments, the performance of desiccant 18 can be driven by an ability to quickly cycle through an absorption state and a desorption state.

Desiccant 18 can comprise any suitable medium in any suitable configuration (e.g., such that desiccant 18 is capable of adsorption and desorption of water). In some embodiments, desiccant 18 can be capable of sorption at a first temperature and/or pressure and desorption at a second temperature and/or pressure. Suitable desiccants or sorption mediums can comprise liquids, solids, and/or combinations thereof. In some embodiments, desiccants or sorption mediums can comprise any suitable porous solid impregnated with hygroscopic materials. For example, desiccant 18 can comprise silica, silica gel, alumina, alumina gel, montmorillonite clay, zeolites, molecular sieves, activated carbon, metal oxides, lithium salts, calcium salts, potassium salts, sodium salts, magnesium salts, phosphoric salts, organic salts, metal salts, glycerin, glycols, hydrophilic polymers, polyols, polypropylene fibers, cellulosic fibers, derivatives thereof, and combinations of thereof. In some embodiments, desiccant 18 can be selected and/or configured to avoid sorption of certain molecules (e.g., molecules that can be poisonous when consumed by a human).

In some embodiments, desiccant particles can be packed in a shallow bed to maximize a surface area for interaction with air or fluid within adsorption zone 22 and desorption zone 30. In some embodiments, the desiccant particles can be agglomerated via a binder. In some embodiments, the desiccant particles can be dyed black (e.g., to improve absorption of thermal radiation). In some embodiments, the desiccant particles can be mixed and/or combined with thermal radiation absorbing materials.

Water generation unit 110 can include one or more blowers 42 and/or one or more circulators 46. For example, in some embodiments, one or more of blower(s) 42 can be disposed in process air pathway 26 and can be configured to adjust a flow rate of air through the process air pathway. In these or other embodiments, one of circulator(s) 46 can be disposed in regeneration fluid pathway 34 and can be configured to adjust a flow rate of fluid through the regeneration fluid pathway. In some embodiments, blower(s) 42 and/or circulator(s) 46 can be controlled by local controller 50 (e.g., controlling a speed of blower(s) 42 and/or circulator(s) 46 to optimize liquid water production). In some embodiments, blower(s) 42 and/or circulator(s) 46 can be configured to substantially maintain a predetermined flow rate through process air pathway 26 and/or regeneration fluid pathway 34, respectively.

Water generation unit 110 can comprise a thermal unit 54 configured to provide thermal energy to fluid in regeneration fluid pathway 34 (e.g., such that desiccant 18 can be regenerated). In some embodiments, thermal unit 54 can be a solar thermal unit (e.g., is configured to convert solar insolation to thermal energy). In many embodiments, although any suitable thermal unit can be implemented, whether solar or otherwise, the following description of thermal unit 54 is provided by way of example.

Thermal unit 54 can comprise a transparent layer 62 configured to allow sunlight to enter casing 58 of the thermal unit (e.g., a sheet of transparent material, a lens, and/or the like, which can comprise glass, polymers, polycrystalline materials, derivatives thereof, combinations thereof, and/or the like). In embodiments comprising a glass transparent layer 62, the glass can be configured to maximize transmissivity (e.g., low-iron and/or no-iron materials, and/or other compositions, uncoated materials, and/or the like). Transparent layers can comprise multiple layers (e.g., multi-pane layers, such as, for example, double-paned glass).

Thermal unit 54 can comprise an absorber 68 configured to absorb thermal energy from the sunlight and provide at least a portion of the absorbed thermal energy to fluid in the regeneration fluid pathway. For example, absorber 68 can comprise a thermally permeable material. Absorber 68 can comprise any suitable material or materials, such as, for example, metals (e.g. aluminum, copper, steel), thermally stable polymers, or other material, and/or the like. Absorber 68 can be substantially flat, roughened, channeled, or corrugated, for example. In some embodiments, a matte black coating or selective film can be applied to the surface of the absorber 68. Absorber 68 can be configured to transfer thermal energy to fluid in regeneration fluid pathway 34 without an intervening heat transfer fluid in some embodiments. In other embodiments, a fluid (e.g., liquid, gas, and/or the like) can be thermally disposed between absorber 68 and fluid in regeneration fluid pathway 34 (e.g., to function as a medium to transfer heat between the absorber and fluid in regeneration fluid pathway 34).

Thermal unit 54 can comprise an insulator 72 configured to insulate at least a portion of casing 58. In this way, solar insolation can enter the casing of thermal unit 54 (e.g., through transparent layer 62), and insulator 72 can insulate a portion of casing 58, such as, for example, to minimize thermal energy losses to an environment outside of thermal unit 54. Insulator 72 can comprise any suitable material or materials (e.g., a material capable of resisting the flow of thermal energy), such as, for example, a solid foam comprising trapped pockets of gas and/or liquid. In some embodiments, insulator 72 can be selected and/or configured for stability at high temperatures (e.g., temperatures exceeding 200° C.).

One or more channels 76 can be disposed in thermal communication with absorber 68 such that absorber 68 can transfer absorbed thermal energy to fluid (e.g., regeneration fluid, a flowable heat carrier medium, and/or the like) within channel(s) 76. Channel(s) 76 can form part of regeneration fluid pathway 34 (e.g., channel(s) 76 can be configured to convey regeneration fluid). Channel(s) 76 can comprise any suitable structure, such as, for example, tubular hollow bodies or a plurality of flat plates adapted for fluid flow therebetween, and/or the like.

Water generation unit 110 can comprise a condenser 80 configured to receive fluid from the desorption zone via the regeneration fluid pathway and produce liquid water from the received fluid (e.g., by condensing water vapor in fluid in the regeneration fluid pathway). Condensers can comprise any suitable material and can be of any suitable configuration (e.g., to condense water vapor in regeneration fluid into liquid water). For example, condenser 80 can comprise polymers, metals, and/or the like. Condenser 80 can be arranged to include coils, fins, plates, tortuous passages, and/or the like. Condenser 80 can be configured to transfer thermal energy from fluid in regeneration fluid pathway 34 downstream of desiccant 18 to air in process air pathway 26 upstream of desiccant 18 (e.g., such that air in process air pathway 26 can facilitate cooling of condenser 80). In some embodiments, condenser 80 can be cooled by ambient air.

Water generation unit 110 can comprise a water collection unit 84 configured to receive liquid water produced by condenser 80. Liquid water produced by condenser 80 can be provided to water collection unit 84 by way of gravity; however, in other embodiments, flow of liquid water from condenser 80 to water collection unit 84 can be assisted (e.g., by one or more pumps, any other suitable delivery mechanism, and/or the like).

In an embodiment, water generation unit 110 can comprise one or more pumps 162. As a non-limiting example, a pump can be configured to pump less than 10 liter/minute (LPM) with an integrated pressure switch.

Referring briefly to FIG. 2, if a line pressure in water conduits 104 between the principal water supply unit 120 and the dispenser 160 is above a predetermined level, the pressure switch can open an electrical circuit to a pump. The pump can be similar or identical to one of pump(s) 162. If the line pressure between the principal water supply unit 120 and the dispenser 160 is below a predetermined level, the pressure switch can close the electrical circuit to the pump. As yet another example, if a user opens a valve associated with the dispenser 160, thereby requesting water, the line pressure between the principal water supply unit 120 and the dispenser 160 will drop, and the pressure switch will close, thereby electrically activating the pump.

Returning again to FIG. 3, water generation unit 110 can comprise a filter or other active water purification element 88 (e.g., a filtration membrane, ozone generator for generating ozone to be pumped into a water reservoir), which can be positioned in proximity to a water reservoir (e.g. between condenser 80 and water collection unit 84) to reduce an amount of impurities, such as, for example, sand, bacteria, fibrous, carbonaceous species, and/or the like, which can be present in liquid water produced). If one or more water purification systems are determined to not be functioning properly (e.g. as determined by an associated sensor), water generation unit 110 can cease delivery of water from the reservoir associated with the failed purification mechanism.

In further embodiments, the dispenser of FIG. 2 can comprise a filter, and the filter can be similar or identical to the filter of water generation unit 110. In these embodiments, the filter can be implemented instead of or in addition to the filter of water generation unit 110.

Water collection unit 84 and/or or filter 88 can comprise an ultraviolet (UV) light source (e.g., for disinfection of water produced by condenser 80). In some embodiments, suitable light sources can comprise light emitting diodes (LEDs) having, for example: wavelengths below 400 nanometers (nm) (e.g., 385 nm, 365 nm, and/or the like), wavelengths below 300 nm (e.g., 265 nm), and/or the like.

Water collection unit 84 can comprise one or more water level sensors (e.g., 122*e*). Such water level sensors can comprise conductance sensors (e.g., open and/or closed circuit resistance-type conductance sensors), which can operate via conductivity measurement of water in the range of 0.1 msiemens per cm.

Water collection unit 84 can comprise a receptacle 92 configured to receive one or more additives for introduction to the produced liquid water. Such additives can be configured to dissolve slowly into liquid water stored in the water collection unit. Additives can include, but are not limited to, minerals, salts, other compounds, and/or the like. In some embodiments, additives can impart flavor to the produced liquid water. For example, additives can include potassium salts, magnesium salts, calcium salts, fluoride salts, carbonate salts, iron salts, chloride salts, silica, limestone, and/or combinations thereof.

Water generation unit 110 can comprise indicators (e.g., lights, such as, for example, LEDs), which can be configured to provide information regarding system operation. For example, in some embodiments, indicator lights can be configured to provide information (e.g., visually, for example, to a user) that the system is running, that solar power (e.g., from power unit 118) is available, that an air filter (e.g., within process air pathway 26) can need to be changed, that water collection unit 84 is full (e.g., in some embodiments, that the water collection unit contains a 20 L volume of liquid water), that an element of water generating unit 110 (e.g., an actuator, which can be similar or identical to actuator 114 of FIG. 4, one or more of blower(s) 42, one or more of circulator(s) 46, and/or the like) has failed and/or is failing, that telematics errors (e.g., as indicated by transceiver 126 operation) have and/or are occurring, and/or the like. As described below, any suitable information (including the information described above with reference to indicators) can be transmitted over a communications network (e.g., alone and/or in addition to operation of any indicators).

Water generation unit 110 can comprise controller 50 for controlling production rate of liquid water from air based on one or more operational parameters for water production. In many embodiments, controller 50 can be similar or identical to computer system 100 (FIG. 1).

Controller 50 can control exposure of desiccant 18 (or a portion thereof) to air in process air pathway 26 and regeneration fluid in regeneration fluid pathway 34 (e.g., to increase and/or optimize the liquid water ultimately produced by condenser 80), and such control can vary over a diurnal cycle (e.g., in response to diurnal variations). Such variations in environmental conditions (e.g., inputs into controller 50) can include, for example, ambient air temperature, ambient air relative humidity, and solar insolation. Other inputs to controller 50 can include, for example, an amount of thermal energy generated by thermal unit 54, a relative humidity of air in process air pathway 26, a relative humidity of fluid in regeneration fluid pathway 34, a temperature of fluid in the regeneration fluid pathway between desiccant 18 and thermal unit 54, a rate of water production, and/or the like. In embodiments that include a purge airflow path, which can be similar or identical to purge airway path 130 of FIG. 4, inputs to controller 50 can include a flow rate, temperature, relative humidity and/or the like of air in the purge airflow path. Controller 50 can be configured to optimize liquid water production by controlling a rate of desiccant 18 movement between the adsorption zone and the desorption zone, controlling a speed of blower(s) 42 and/or circulator(s) 46, and/or the like, based, on measurements of one or more of such inputs (e.g., such that controller 50 can optimize liquid water production based on current environmental and system conditions). As described in more detail below, inputs to controller 50 can be measured in that they are indicated in data captured by one or more sensors. The sensor(s) can be similar or identical sensor(s) 122 of FIG. 4.

Specific embodiments and functions of controllers that can be used to implement controller 50 are described in greater detail in the co-pending PCT Application No. PCT/US2015/061921, filed Nov. 20, 2015, which is hereby incorporated by reference in its entirety.

Figure 4:
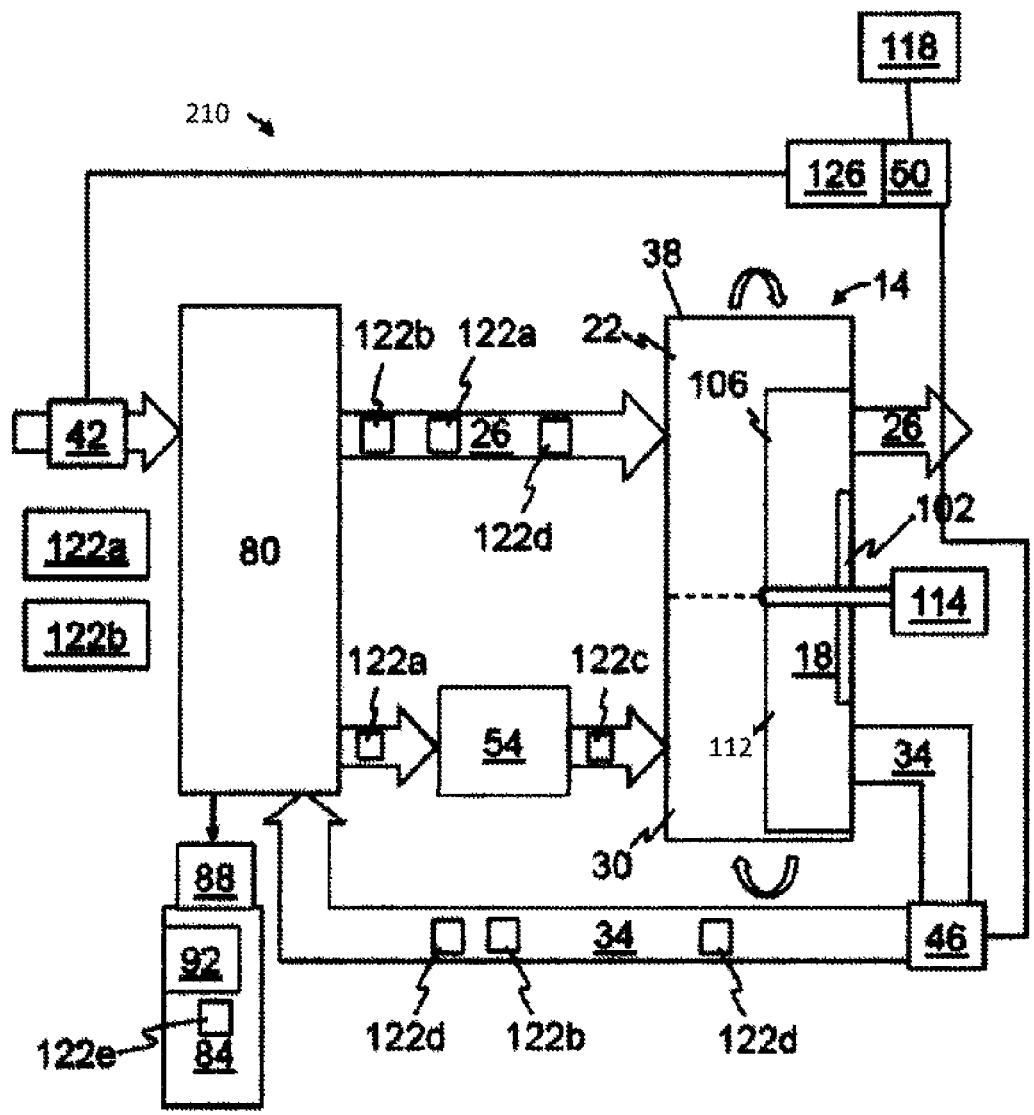
FIG. 4 is a diagram of a system for generating liquid water from air according to an embodiment.

Turning ahead in the drawings, FIG. 4 is a diagram of an embodiment 210 of a unit for generating liquid water from air. Water generation unit 210 can be similar or identical to water generation unit 110 of FIG. 3. However, in some embodiments, water generation unit 210 can differ from water generation unit 110 of FIG. 3 as described below. Otherwise, water generation unit 210 can comprise any and/or all features described with respect to water generation unit 110 of FIG. 3.

In many embodiments, desiccant 18 (or a first portion thereof) can be in fluid communication with process air in process air pathway 26 while desiccant unit 14 (or a second portion thereof) is simultaneously in fluid communication with regeneration fluid in regeneration fluid pathway 34, and, thus, desiccant unit 14 operates in a continuous and non-batch manner. In this embodiment, sections of desiccant 18 can be exposed to air in process air pathway 26 and fluid in regeneration fluid pathway 34 in an alternating manner.

Water generation unit 210 can comprise a rotatable disk 102 (e.g., with desiccant 18 disposed thereon). Desiccant 18 (or sections thereof) can be configured to move between adsorption zone 22 and desorption zone 30 as disk 102 is rotated. For example, in the depicted orientation of disk 102, a portion 106 of desiccant 18 is in communication with process air pathway 26, and a portion 112 of disk 102 is in communication with regeneration fluid pathway 34. Water generation unit 210 can comprise an actuator 114 configured to cause rotation of disk 102. For example, actuator 114 can comprise a motor. Controller 50 can be configured to optimize liquid water production at least by controlling movement (e.g., through control of actuator 114) of desiccant 18 (e.g., disk 102) between adsorption zone 22 and desorption zone 30. In other embodiments, actuator 114 can rotate disk 102 at a predetermined rotation rate.

Water generation unit 210 can comprise a solar power unit 118 configured to provide power to at least a portion of water generation unit 210 (e.g., blower(s) 42, circulator(s) 46, actuator 114, and/or the like). Solar power unit 118 can be configured to convert solar insolation to electrical power (e.g., solar power unit 118 comprises a solar panel). For example, solar power unit 118 can be provided as a photovoltaic (PV) solar panel comprising semiconducting materials exhibiting a photovoltaic effect. In these and similar embodiments, controller 50 can be configured to control water generation unit 210 in response to diurnal variations in solar insolation (e.g., an amount of electrical power generated by solar power unit 118).

Systems for generating liquid water from air can be modular in nature. For example, systems can be configured such that each component (e.g. solar power unit 118, thermal unit 54, desiccant unit 14, condenser 80, local water collection unit 84, and/or the like) can be separated from one another, transported, assembled and/or re-assembled with one another (e.g., in a same or a different configuration), and/or the like. For example, in some embodiments, the system can be configured such that no dimension of any singular component (e.g., water collection unit 84, desiccant unit 14, solar power unit 118, thermal unit 54, condenser 80, and/or the like) is larger than six to eight feet (e.g., to facilitate transport of the system or components thereof, for example, in a single cab truck bed, such as a bed of a Toyota Hilux pickup truck) (e.g., each component has a footprint that is less than or equal to 64 square feet ($ft^2$) and/or each component can be contained within a cubic volume less than or equal to 512 cubic feet ($ft^3$)). Any desirable number of water generation unit 210 can be spread across a water management areas depending on historical and/or expected ambient conditions within the water management area, building or structures within the water management area, populations within the water management area and so on.

Controller 50 can be configured to control blower(s) 42, circulator(s) 46, actuator 114, and/or the like (e.g., to optimize liquid water production, where such control can be in response to diurnal variations, for example, in ambient temperature, ambient air relative humidity, solar insolation, and/or the like). For example, controller 50 can be configured to increase a rate of liquid water production by controlling blower(s) 42, circulator(s) 46, actuator 114, and/or the like, taking into account, for example, diurnal variations. Such variations can change the amount of thermal energy generated by thermal unit 54, the level of electrical power provided by solar power unit 118, the level of humidity in process air entering the system, and/or the like. In some embodiments, ambient conditions can be measured in real-time or can be forecast based on, for example, historical averages and/or the like. In embodiments in which controller 50 receives real-time measurements, various sensors (described in more detail below) can provide data indicative of ambient conditions to controller 50 (e.g., continuously, periodically, when requested by controller 50, and/or the like).

Controller 50 can operate water generation unit 210 based on one or more of: a user selection, data received from one or more sensors, programmatic control, and/or by any other suitable bases. For example, controller 50 can be associated with peripheral devices (including sensors) for sensing data information, data collection components for storing data information, and/or communication components for communicating data information relating to the operation of the system.

Water generation unit 210 can comprise one or more peripheral devices, such as one or more sensors 122 (e.g., temperature sensors 122a, humidity sensors 122b, solar insolation sensor 122c, flow rate sensors 122d, water level sensors 122e, and/or the like). In some embodiments, sensor(s) 122 can provide data indicative of ambient air temperature, ambient air relative humidity, solar insolation, process air temperature, regeneration fluid temperature, process air relative humidity, regeneration fluid relative humidity, process air flow rate, regeneration fluid flow rate, liquid water production rate, water usage rate, and/or the like.

Sensor(s) 122 can be located remotely from other components of water generation unit 210 and can provide captured data to the other components of water generation unit 210 via a wired and/or wireless connection. For example, a town, village, city, and/or the like can include a plurality of water generation unit 210, and one of the plurality of water generation unit 210 can provide data indicative of ambient environmental conditions (e.g., air temperature, air relative humidity, a solar insolation level, and/or the like) to another one of the plurality of water generation unit 210. In this way, in some embodiments, a single sensor of sensor(s) 122 can be shared by multiple of water generation unit 210. In some embodiments, data communicated to a controller (e.g., controller 50) by one or more peripheral devices (e.g., one or more of sensor(s) 122) can be stored in a data logging unit.

Controller 50 can be configured to vary operation of water generation unit 110 of FIG. 3 and/or water generation unit 210 of FIG. 4 at least based on real-time and/or forecast variations in ambient conditions. For example, controller 50 can control exposure of desiccant 18 (e.g., or sections thereof) to process air and regeneration fluid in response to changes in ambient conditions (e.g., by changing the rotational speed of disk 102, such that the time that a portion of desiccant 18 disposed thereon is exposed to process air in process air pathway 26 or regeneration fluid in regeneration fluid pathway 34 can be increased or decreased). In some embodiments, controller 50 can be configured to vary a size of an adsorption zone or a desorption zone (e.g., in response to diurnal variations). As will be described in more detail below, controller 50 can be configured to vary operation of water generation unit 110 of FIG. 3 and/or water generation unit 210 of FIG. 4 at least based on water production or distribution parameters communicated over a wireless network.

Water generation unit 110 of FIG. 3 and/or water generation unit 210 of FIG. 4 can comprise a telematics unit (e.g., a transmitter, receiver, transponder, transverter, repeater, transceiver, and/or the like, sometimes referred to herein as "transceiver 126"). For example, a transceiver 126 can be configured to communicate operational parameters and/or data to and/or from water generation unit 110 of FIG. 3 and/or water generation unit 210 of FIG. 4 (e.g., controller 50) via a wired and/or wireless interface. In on example, wireless communications can conform to standardized communications protocols, such as, for example, GSM, SMS components operating at relatively low rates (e.g., operating every few minutes), protocols that can be geographically specified, and/or the like).

Figure 5:
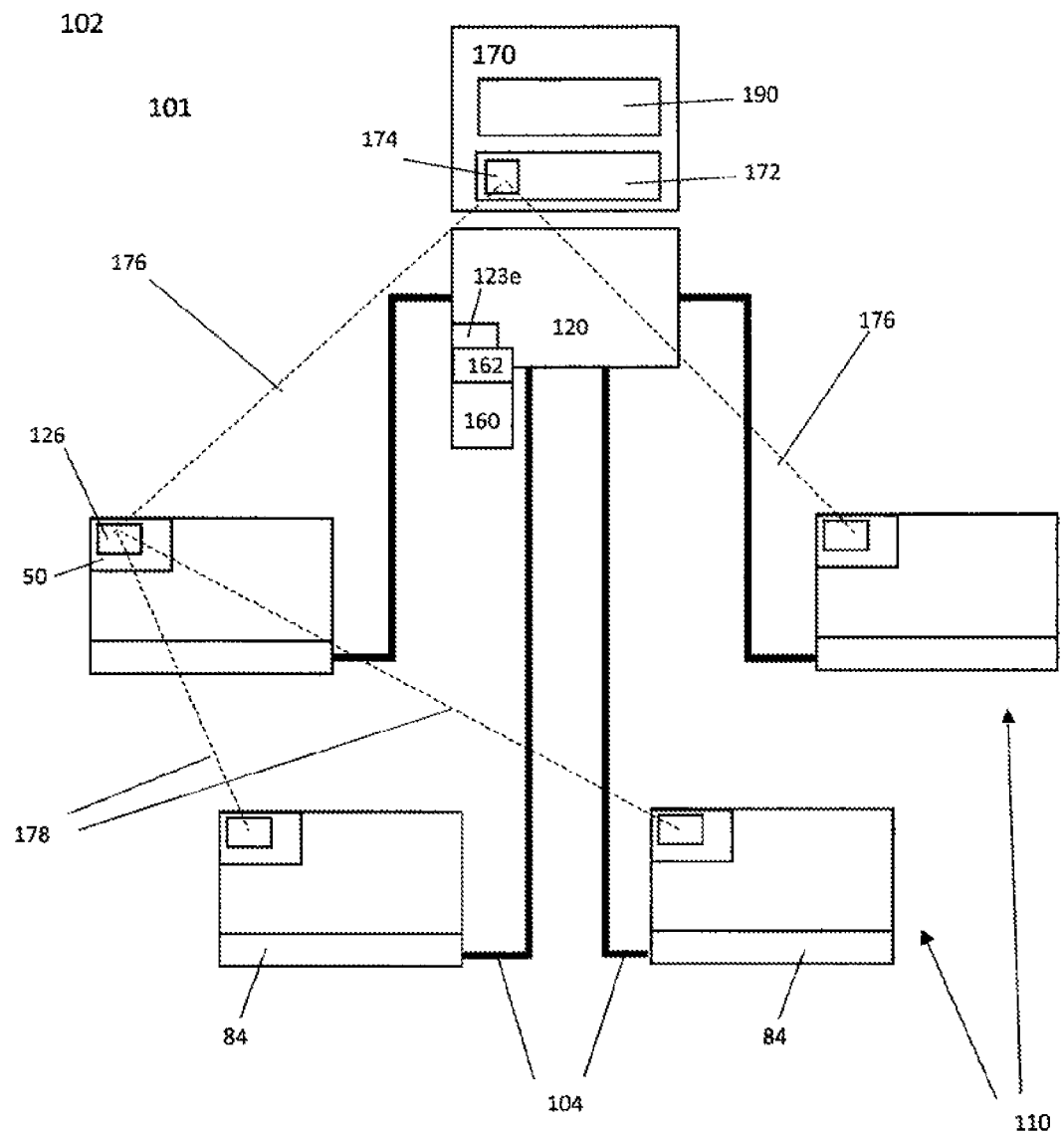
FIG. 5 is a diagram of an exemplary array of water generation units according to an embodiment.

Turning ahead in the drawings, FIG. 5 depicts an array 101 of water generation units 110 located in water management area 102. In some embodiments, the array 101 can be similar or identical to the array 101 of FIG. 1 and/or the array of FIG. 2. In some embodiments, the water generation units 110 can be similar or identical to the water generation units 110 of FIG. 1 and/or the water generation units 110 of FIG. 2. Further, one or more of the water generation units 110 can be similar or identical to water generation unit 110 of FIG. 3 and/or water generation unit 210 of FIG. 4. In these or other embodiments, the principal water supply unit 120 can be similar or identical to the principal water supply unit 120 of FIG. 1 and/or the principal water supply unit 120 of FIG. 2. Further, the principal water supply unit 210 can be similar or identical to water generation unit 110 of FIG. 3 and/or water generation unit 210 of FIG. 4.

Principal water supply unit 120 is in fluid communication with water collection units 84 via liquid water conduits 104. The principal water supply unit 120 comprises a dispenser 160 for dispensing water therefrom. The principal water supply unit 120 and the dispenser 160 can be physically located together, or in other embodiments be physically separated such as depicted in FIG. 2. The principal water supply unit 120 and/or dispenser 160 can comprise one or more water level sensors 123e. Such water level sensor(s) can comprise conductance sensors (e.g., open and/or closed circuit resistance-type conductance sensors), which can operate via conductivity measurement of water in the range of 0.1 msiemens per cm. In embodiments where the principal water supply unit 120 is coupled to or comprises one or more sensors (e.g. water level sensors), operational parameters for water distribution can be based on at least one signal received from the one or more sensors (e.g. water level sensors) and communicated over a communications channel or network.

In one example, principal water supply unit 120 can include a two-position water level sensor in its associated reservoir. The two positions can be set to indicate "low" and "high" water levels in the reservoir. A two-position water level sensor could be configured with three possible levels:
1) "Low" level wherein a low-position sensor can be closed, and a high-position sensor can be open;
2) "Normal" level wherein both the low-position sensor and the high-position sensor can be open; and,
3) "High" level wherein the low-position sensor can be open, and the high-position sensor can be closed.

In some embodiments, the low-position sensor and the high-position sensor cannot both be closed. If this condition is present, it could, for example, indicate a possible electrical fault condition with the water level sensor.

The principal water supply unit 120 can comprise a reservoir. In some embodiments, the principal water supply unit 120 can comprise a water generation unit similar or identical to water generation unit 110 of FIG. 3 and/or water generation unit 210 of FIG. 4. For example, in some embodiments, the reservoir of principal water supply unit 120 can have a larger water storage volume than water collection units 84 of other water generation units 110 in the water management area 102. For example, the volume of one or more of water collection units 84 can be less than 50 liters and the volume of the reservoir of principal water supply unit 120 can be greater than or equal to 50 liters. In some embodiments, a plurality of principal water supply unit 120 can be located within a water management area. The principal water supply unit 120 can be in fluid communication with one, some or all of water generation units 110 in a particular water management area. The array 101 can comprise an array communications unit 170 for establishing a wireless communications network of water generation units 110. The array communications unit 170 can comprise a network manager 172 and a transceiver 174 for establishing a communication link 176 with controllers 50 of water generation units 110 in array 102. The array communications unit 170 further can establish a wired or wireless communication link with the principal water supply unit 120. The network manager 172 can establish a wireless mesh communications network comprising the network manager 172, the principal water supply unit 120 and water generation units 110 (e.g. via transceivers 126). Transceivers 126 of water generation units 110 can establish a wireless communications link 178 between other water generation units 110 and/or controllers 50 (e.g. via transceivers 126).

Turning ahead in the drawings, FIG. 7 is a diagram of a system 100 for managing production and distribution of liquid water extracted from ambient air according to an embodiment.

System 100 can comprise an array communications unit 170. The array communication unit 170 can be similar or identical to the array communications unit 170 of FIG. 5. For example, the array communications unit 170 can comprise a gateway 190 for communicating with the network manager 172 and communications channel 180.

For example, operational parameters for water production and distribution can be sent across communications channel 180. The communication channel 180 can be established by a cloud network, a local area network, Internet, a satellite, a serial bus, wired connections, or a combination thereof. Communications can also be facilitated by a cellular tower in cellular range of an array of water generation units.

Figure 6:
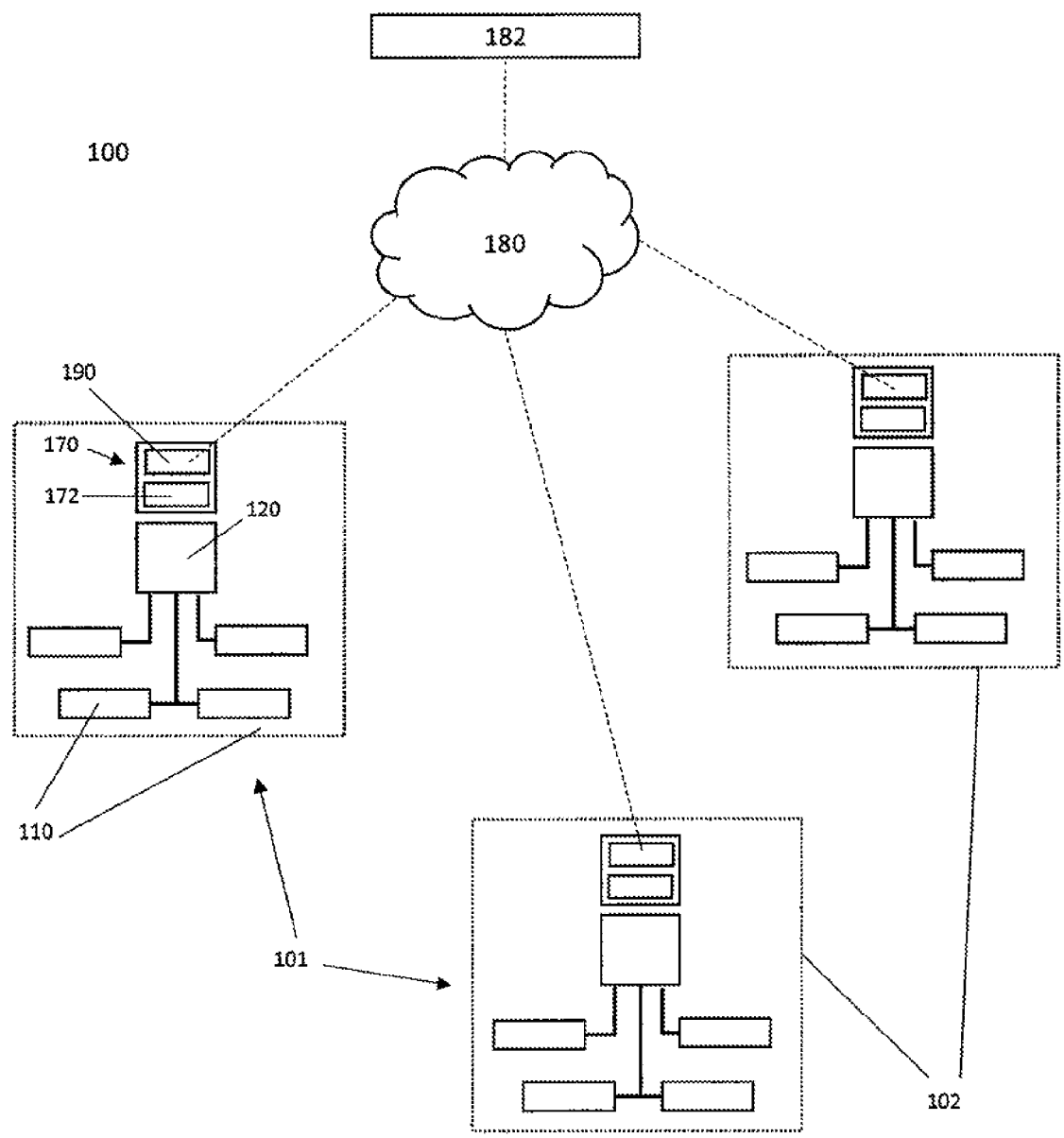
FIG. 6 is a diagram of a system for managing production and distribution of liquid water extracted from ambient air according to an embodiment.
Figure 10:
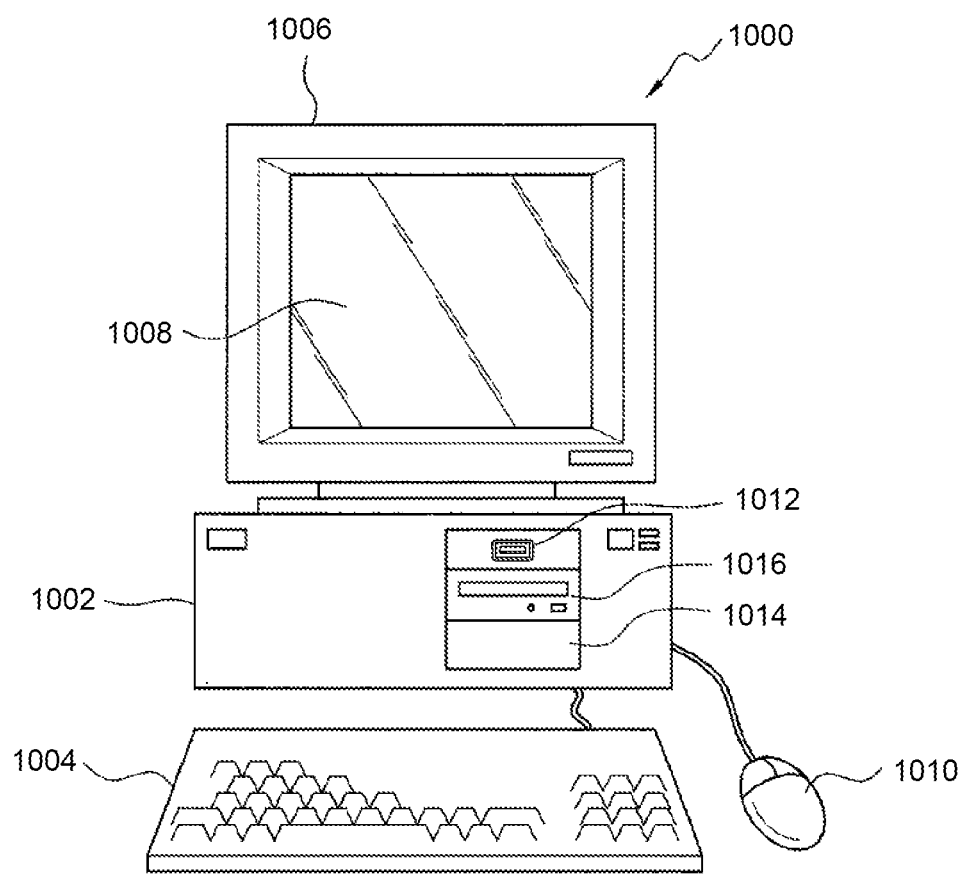
FIG. 10 illustrates a front elevational view of an exemplary computer system that is suitable to implement at least part of the techniques, methods, and systems described herein.

The array communications unit 170 and/or gateway 190 can be connected to communications channel 180 (e.g., a cloud network, the Internet) via any suitable networking hardware (e.g., cellular data modem, wired or wireless Internet connection, etc.). Accordingly, water generation units 110 can communicate, via the communications channel 180 through array communications unit 170 and/or gateway 190. A water management host unit 182 can communicate to and/or from water production and management arrays 101 through the communications channel 180. The water management host unit 182 can comprise a host computer including a processor, database and a user interface. In some embodiments, a database can be configured to store information received over the communications network. The water management host unit 182 can be similar or identical to computer system 1000 (FIG. 10). Three water production and management arrays 101 in three water management areas 102 are depicted in FIG. 6, though any number of water production and management arrays in any number or configuration of water management areas can be implemented.

The water management host unit 182, a network administrator, or water generation unit owner can send a command to the controllers of water generating units 110 to update or delete look-up table data (e.g. as described in co-pending PCT Application No. PCT/US2015/061921, filed Nov. 20, 2015, which is hereby incorporated by reference in its entirety) and/or a control algorithm. Furthermore, data security can be maintained, for example, in the case that the system is stolen or otherwise lost.

Referring again to FIG. 5, water generation units 110 can be arranged any desirable configuration across any desirable water management areas. In one example, a distance between two of water generation units 110 and their associated communications links 176 can be greater than 1 kilometer. As another example, a water management area 102 can be greater than 1 square kilometer.

Water generation units 110 can communicate with one another using transceivers 126. Transceivers 126 can be a radio frequency (RF) transceiver (e.g. GSM radio, 802.15.4 radio) so as to establish a radio communications link. In one example, the radio frequency (RF) transceiver is configured to transmit and receive radio frequencies below 1 GHz. As another example, transceivers 126 can communicate with other controllers and/or the array communications unit via Zigbee or cell phone standards (e.g. 3G). Each controller 50 can include a network protocol stack (e.g., MiWi, 6LoW-PAN, etc.) for creating a wireless mesh network connecting one or more water generation units 110 to array communications unit 170 and/or gateway 190. The gateway 190 can be part of the array communications unit 170 or can be physically remote or separate from the array communications unit 170. In some cases, gateway 190 can be integrated into one or more of systems water generation units 110. Four water generation units 110, one principal reservoir and one gateway array communications network 170 are shown in the example of FIG. 5, though any number of water generation units, principal reservoir units and/or array communications units can be implemented.

In some embodiments, water generation units 110 can communicate with one another, such that one of water generation units 110 can forward communications for another one of water generation units 110 to and from array communications unit 170 and/or gateway 190. Water generation units 110 can also communicate directly with array communications unit 170 and/or gateway 190. For example, local weather data can be communicated between water generation units 110 in array 101.

Each water generation unit 110 and/or principal water supply unit 120 can gather telemetry data and report it to water management host 182 via communication channel 180. For example, controllers 50 can periodically (e.g., every two minutes) assemble and send a data stream including some or all of the following operational parameters for water production to array communications unit 170 and/or gateway 190: ambient temperature, hot-side temperature, ambient relative humidity, external relative humidity, photovoltaic voltage, photovoltaic current, photovoltaic power, desiccant unit wheel motor target speed, desiccant unit wheel motor measured speed, regeneration fluid fan target speed, regeneration fluid fan measured speed, process fan target speed, process fan measured speed, water vapor flux (VAP), water level and/or accumulated water count. Sensor signals can include a signal indicative of ambient temperature, ambient relative humidity, solar insolation, water extraction efficiency, local water production rate, local water reservoir level, principal water reservoir level, principal water reservoir usage, water dispensing rate from the dispenser, or a combination thereof. In many embodiments, water vapor flux (VAP) can refer to the net water vapor mass entering or exiting water generation unit 110 and/or principal water supply unit 120.

Controllers 50 can also receive commands via communications channel 180, for example, but not limited to start water production, stop water production, start transfer of water to principal water reservoir unit, stop transfer of water to principal water reservoir unit, read configuration, write configuration, and/or reboot. Controllers 50 can also accept memory programming commands for upgrades. Controllers 50 can make use of AES-128 encryption or other suitable security measures to transfer memory programming data and CRC algorithms to ensure memory programming data integrity in some embodiments.

The system 100 and/or array 101 can be configured to maintain a principal water level of the reservoir of principal water supply unit 120 based on various operational parameters for water production and distribution. As one example, if the water level of the reservoir of principal water supply unit 120 is sensed to be below a predetermined threshold amount (e.g. during or after water is dispensed from dispensing unit 160), a signal indicative of principal reservoir water level can be transmitted to array communications unit 170 and or directly to one or more of water generation units 110. Water generation units 110 can receive a signal via transceivers 126 to pump water from one or more of water collection units 84 to the principal water reservoir 120 via one or more of water conduits 104.

A method for operating a system for production and distribution of liquid water extracted from air is also disclosed herein. FIG. 7 depicts a flowchart for a method 300 for managing production and distribution of liquid water extracted from air.

In many embodiments, method 300 can comprise activity 301 of establishing a wireless mesh communications network comprising the network manager, the principal water reservoir unit and said local controllers of water generation units.

At activity 304 of method 300, one or more local controllers and/or a water management host unit can control a production rate of liquid water from air based on one or more operational parameters for water production. For example, operational parameters for water production can be transmitted to and/or from water generation units in the water management area. Transmission of operational parameters can include transmission via the array communications unit and/or directly between water generation units in the water management area.

Non-limiting examples of operational parameters for water production can include ambient temperature, hot-side temperature, ambient relative humidity, solar insolation, photovoltaic voltage, photovoltaic current, photovoltaic power, wheel motor target speed, wheel motor measured speed, regeneration fluid fan target speed, regeneration fluid fan measured speed, process fan target speed, process fan measured speed, water extraction efficiency, accumulated water count, local water production rate, local water reservoir level, principal water reservoir level, principal water reservoir usage, water dispensing rate from the dispenser or a combination thereof.

In further embodiments, method 300 can comprise activity 306 of determining one or more operational parameters for water distribution. For example, determining one or more operational parameters for water distribution can comprise determining a water level of the principal reservoir is below a predetermined threshold. As another example, determining one or more operational parameters for water distribution can comprise determining a water level of one or more of the local water collection units is below a predetermined threshold. In yet another example, determining one or more operational parameters for water distribution can comprise determining a water usage rate is above a predetermined threshold. In some embodiments, the method comprises sensing at least one signal received from one or more sensors coupled to the principal reservoir and/or water generation units at activity 306.

In further embodiments, method 300 can comprise activity 308 of transmitting one or more operational parameters for water distribution to one or more local controllers across the wireless mesh network.

In further embodiments, method 300 can comprise activity 310 of transferring a volume of liquid water from one or more local water collection units to the principal reservoir based on the operational parameters for water distribution. For example, the water level of the principal reservoir and/or principal reservoir water usage data can be transmitted to one or more local controllers. A predefined volume of liquid water from one or more local water collection units can then be transferred to the principal reservoir via one or more liquid water conduits.

In some embodiments, method 300 can comprise an activity of sensing a signal received from one or more sensors coupled to a water production unit and/or a principal water reservoir. For example, a signal can be indicative of ambient temperature, hot-side temperature, ambient relative humidity, solar insolation, photovoltaic voltage, photovoltaic current, photovoltaic power, wheel motor target speed, wheel motor measured speed, regen fan target speed, regen fan measured speed, process fan target speed, process fan measured speed, water extraction efficiency, accumulated water count, local water production rate, local water reservoir level, principal water reservoir level, principal water reservoir usage, or a combination thereof.

Figure 8:
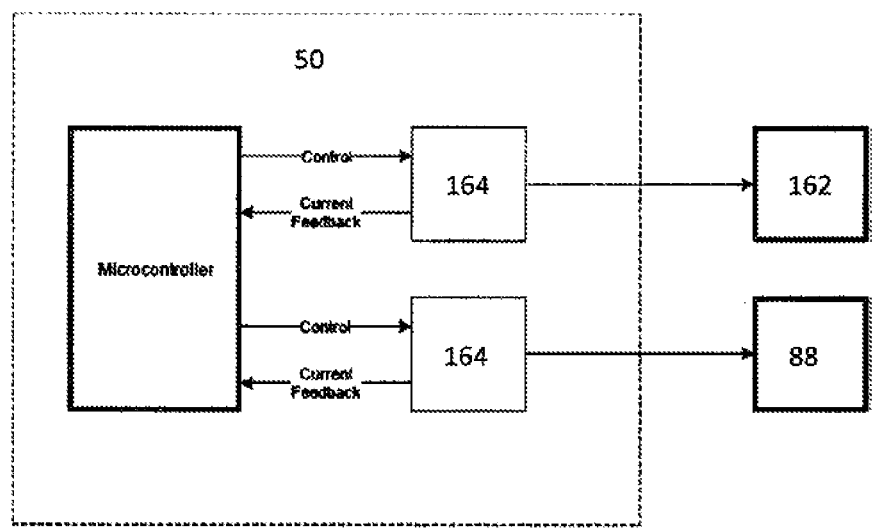
FIG. 8 depicts a controller for managing production and distribution of liquid water from ambient air according to an embodiment.

FIG. 8 depicts a controller for managing production and distribution of liquid water from ambient air according to an embodiment. The controller can be similar or identical to the controller of FIG. 3, the controller of FIG. 4, and/or the controller of FIG. 5. Further, the controller can be similar or identical to computer system 1000 (FIG. 10).

Controller 50 can include an electronic circuit board assembly that can include a battery and one or more switches 164 (e.g. one or more field-effect-transistors (FETs)) so as to provide power to pump 162 and/or a water purification system 88 (e.g., ozonator). Switch(es) 164 can provide a current feedback signal that represents the electrical current flowing through the load (e.g. pump 162 or water purification system 88).

A water level sensor at a principal water supply unit can transmit a "Low" level, "normal" level, or "High" level operation parameter (e.g. signal) to controller 50. If the water level of the reservoir of the principal water supply unit, for example as indicated by a water level sensor, is not "low" and the water purification system 88 has not failed based on the water purification unit feedback current, the controller 50 can activate the switch of switch(es) 164 associated with pump 162, thereby providing power to the pump 162. If the hub or principal water reservoir level, for example as indicated by a water level sensor, is not "low" or water purification system 88 has failed based on the water purification system 88 feedback current, controller 50 can deactivate the switch of switch(es) 164 associated with pump 162, thereby removing power to pump 162. In some embodiments, a pulsed signal can be transmitted, wherein feedback logic is used to show how much current is flowing through pump 162.

Figure 9:
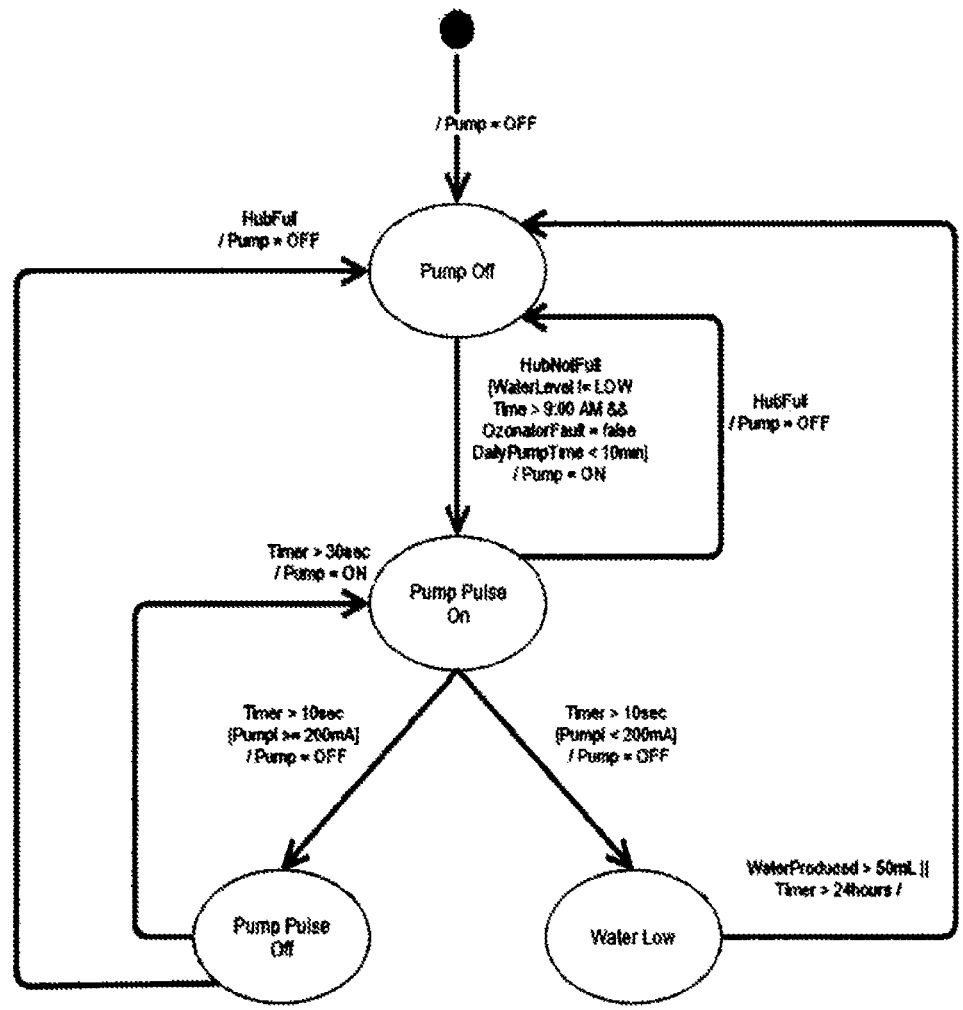
FIG. 9 depicts a method for managing production and distribution of liquid water extracted from ambient air according to an embodiment.

A non-limiting example of a method for operating a system for production and distribution of liquid water extracted from air is depicted in FIG. 9. A controller of a water generation unit can indirectly sense if the water level in the water collection unit of the water generation unit is low based on the current feedback from a switch of the controller that provides power to a pump of the water generation unit. For example, the pump can draw 500 mA when pumping water, and 150 mA when pumping air. If the pump current is greater than 75 mA but less than 200 mA, the controller can assume that the water level in the water collection unit is low. In this non-limiting example, if either of the following operational parameters or conditions are true while the controller assumes the water level in the water collection unit is low, the controller can assume the water level in the water collection unit is not low and can resume pumping. If all of the following operational parameters or conditions are true, the controller can activate the pump, thereby delivering water from the water collection unit to a reservoir of a principal water supply unit, for example is a pulsed manner (e.g. 10-seconds every 30 seconds). Operational parameters or conditions can include the following:

Water level of the reservoir of the principal water supply unit is NOT high based on the most recent data received or sensed;

Water purification system at a water generation unit has not failed based on current feedback from controller switch (e.g. FET);

Time-of-Day is later than 9:00 AM;

Water generation unit has not pumped for more than 10 minutes since 12:00 AM.

In an embodiment, the water generation unit can pulse its pumping of water to the reservoir of the principal water supply unit to compensate for propagation delays in the water level sensing of the principal water supply unit and communication delays in the wireless mesh network.

Turning ahead in the drawings, FIG. 10 illustrates an exemplary embodiment of a computer system 1000, all of which or a portion of which can be suitable for (i) implementing part or all of one or more embodiments of the techniques, methods, and systems and/or (ii) implementing and/or operating part or all of one or more embodiments of the memory storage devices described herein. For example, in some embodiments, all or a portion of computer system 1000 can be suitable for implementing part or all of one or more embodiments of the techniques, methods, and/or systems described herein. Furthermore, one or more elements of computer system 1000 (e.g., a refreshing monitor 1006, a keyboard 1004, and/or a mouse 1010, etc.) also can be appropriate for implementing part or all of one or more embodiments of the techniques, methods, and/or systems described herein.

In many embodiments, computer system 1000 can comprise chassis 1002 containing one or more circuit boards (not shown), a Universal Serial Bus (USB) port 1012, a hard drive 1014, and an optical disc drive 1016. Meanwhile, for example, optical disc drive 1016 can comprise a Compact Disc Read-Only Memory (CD-ROM), a Digital Video Disc (DVD) drive, or a Blu-ray drive. Still, in other embodiments, a different or separate one of a chassis 1002 (and its internal components) can be suitable for implementing part or all of one or more embodiments of the techniques, methods, and/or systems described herein.

Figure 11:
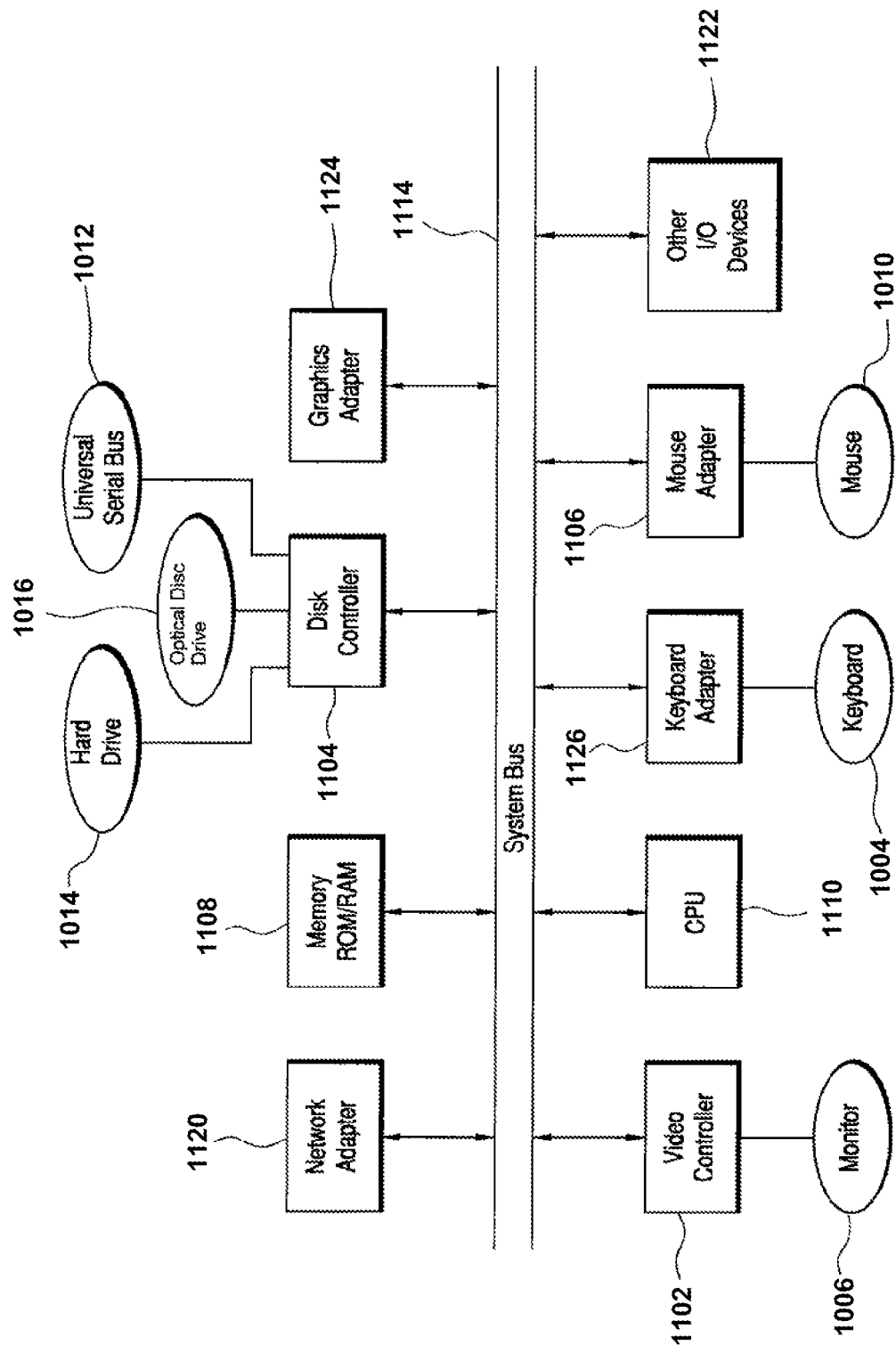
FIG. 11 illustrates a representative block diagram of exemplary elements included on the circuit boards inside a chassis of the computer system of FIG. 10.

Turning ahead in the drawings, FIG. 11 illustrates a representative block diagram of exemplary elements included on the circuit boards inside chassis 1002 (FIG. 11). For example, a central processing unit (CPU) 1110 is coupled to a system bus 1114. In various embodiments, the architecture of CPU 1110 can be compliant with any of a variety of commercially distributed architecture families.

In many embodiments, system bus 1114 also is coupled to a memory storage unit 1108, where memory storage unit 1108 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 1108 can comprise (i) non-transitory memory and/or (ii) transitory memory.

The memory storage device(s) of the various embodiments disclosed herein can comprise memory storage unit 1108, an external memory storage drive (not shown), such as, for example, a USB-equipped electronic memory storage drive coupled to universal serial bus (USB) port 1012 (FIGS. 10 & 11), hard drive 1014 (FIGS. 10 & 11), optical disc drive 1016 (FIGS. 10 & 11), a floppy disk drive (not shown), etc. As used herein, non-volatile and/or non-transitory memory storage device(s) refer to the portions of the memory storage device(s) that are non-volatile and/or non-transitory memory.

In various examples, portions of the memory storage device(s) of the various embodiments disclosed herein (e.g., portions of the non-volatile memory storage device(s)) can be encoded with a boot code sequence suitable for restoring computer system 1000 (FIG. 10) to a functional state after a system reset. In addition, portions of the memory storage device(s) of the various embodiments disclosed herein (e.g., portions of the non-volatile memory storage device(s)) can comprise microcode such as a Basic Input-Output System (BIOS) or Unified Extensible Firmware Interface (UEFI) operable with computer system 1000 (FIG. 10). In the same or different examples, portions of the memory storage device(s) of the various embodiments disclosed herein (e.g., portions of the non-volatile memory storage device(s)) can comprise an operating system, which can be a software program that manages the hardware and software resources of a computer and/or a computer network. Meanwhile, the operating system can perform basic tasks such as, for example, controlling and allocating memory, prioritizing the processing of instructions, controlling input and output devices, facilitating networking, and managing files. Exemplary operating systems can comprise (i) Microsoft® Windows® operating system (OS) by Microsoft Corp. of Redmond, Washington, United States of America, (ii) Mac® OS by Apple Inc. of Cupertino, California, United States of America, (iii) UNIX® OS, and (iv) Linux® OS. Further exemplary operating systems can comprise (i) iOS™ by Apple Inc. of Cupertino, California, United States of America, (ii) the Blackberry® OS by Research In Motion (RIM) of Waterloo, Ontario, Canada, (iii) the Android™ OS developed by the Open Handset Alliance, or (iv) the Windows Mobile™ OS by Microsoft Corp. of Redmond, Washington, United States of America. Further, as used herein, the term "computer network" can refer to a collection of computers and devices interconnected by communications channels that facilitate communications among users and allow users to share resources (e.g., an internet connection, an Ethernet connection, etc.). The computers and devices can be interconnected according to any conventional network topology (e.g., bus, star, tree, linear, ring, mesh, etc.).

As used herein, the term "processor" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 1110.

In the depicted embodiment of FIG. 11, various I/O devices such as a disk controller 1104, a graphics adapter 1124, a video controller 1102, a keyboard adapter 1126, a mouse adapter 1106, a network adapter 1120, and other I/O devices 1122 can be coupled to system bus 1114. Keyboard adapter 1126 and mouse adapter 1106 are coupled to keyboard 1004 (FIGS. 10 & 11) and mouse 1010 (FIGS. 10 & 11), respectively, of computer system 1000 (FIG. 10). While graphics adapter 1124 and video controller 1102 are indicated as distinct units in FIG. 11, video controller 1102 can be integrated into graphics adapter 1124, or vice versa in other embodiments. Video controller 1102 is suitable for refreshing monitor 1006 (FIGS. 10 & 11) to display images on a screen 1008 (FIG. 10) of computer system 1000 (FIG. 10). Disk controller 1104 can control hard drive 1014 (FIGS. 10 & 11), USB port 1012 (FIGS. 10 & 11), and CD-ROM drive 1016 (FIGS. 10 & 11). In other embodiments, distinct units can be used to control each of these devices separately.

Network adapter 1120 can be suitable to connect computer system 1000 (FIG. 10) to a computer network by wired communication (e.g., a wired network adapter) and/or wireless communication (e.g., a wireless network adapter). In some embodiments, network adapter 1120 can be plugged or coupled to an expansion port (not shown) in computer system 1000 (FIG. 10). In other embodiments, network adapter 1120 can be built into computer system 1000 (FIG. 10). For example, network adapter 1120 can be built into computer system 1000 (FIG. 10) by being integrated into the motherboard chipset (not shown), or implemented via one or more dedicated communication chips (not shown), connected through a PCI (peripheral component interconnector) or a PCI express bus of computer system 1000 (FIG. 10) or USB port 1012 (FIG. 10).

Returning now to FIG. 10, although many other components of computer system 1000 are not shown, such components and their interconnection are well known to those of ordinary skill in the art. Accordingly, further details concerning the construction and composition of computer system 1000 and the circuit boards inside chassis 1002 are not discussed herein.

Meanwhile, when computer system 1000 is running, program instructions (e.g., computer instructions) stored on one or more of the memory storage device(s) of the various embodiments disclosed herein can be executed by CPU 1110 (FIG. 11). At least a portion of the program instructions, stored on these devices, can be suitable for carrying out at least part of the techniques, methods, and activities of the methods described herein. In various embodiments, computer system 1000 can be reprogrammed with one or more systems, applications, and/or databases to convert computer system 1000 from a general purpose computer to a special purpose computer.

Further, although computer system 1000 is illustrated as a desktop computer in FIG. 10, in many examples, system 1000 can have a different form factor while still having functional elements similar to those described for computer system 1000. In some embodiments, computer system 1000 can comprise a single computer, a single server, or a cluster or collection of computers or servers, or a cloud of computers or servers. Typically, a cluster or collection of servers can be used when the demand on computer system 1000 exceeds the reasonable capability of a single server or computer. In certain embodiments, computer system 1000 can comprise an embedded system.

In many embodiments, part or all of one or more embodiments of the techniques, methods, and systems can be implemented with hardware and/or software. In some embodiments, at least part of the hardware and/or software can be conventional, while in these or other embodiments, part or all of the hardware and/or software can be customized (e.g., optimized) for implementing the part or all of the one or more embodiments of the techniques, methods, and systems. When implemented in software (e.g., firmware), the part or all of the one or more embodiments of the techniques, methods, and systems can be stored as one or more instructions or code on a non-transitory computer-readable medium. Examples include non-transitory computer-readable media encoded with a data structure and non-transitory computer-readable media encoded with a computer program. Non-transitory computer-readable media are physical computer storage media. A physical storage medium can be any available medium that can be accessed by a computer. By way of example, and not limitation, such non-transitory computer-readable media can comprise RAM, ROM, EPROM, EEPROM, CD-ROM or other optical disk storage, magnetic disk storage or other magnetic storage devices, or any other physical medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above are also be included within the scope of non-transitory computer-readable media. Moreover, the functions described above can be achieved through dedicated devices rather than software, such as a hardware circuit comprising custom VLSI circuits or gate arrays, off-the-shelf semiconductors such as logic chips, transistors, or other discrete components, all of which are non-transitory. Additional examples include programmable hardware devices such as field programmable gate arrays, programmable array logic, programmable logic devices or the like, all of which are non-transitory. Still further examples include application specific integrated circuits (ASIC) or very large scale integrated (VLSI) circuits. In fact, persons of ordinary skill in the art can utilize any number of suitable structures capable of executing logical operations according to the described embodiments.

Although the invention has been described with reference to specific embodiments, it will be understood by those skilled in the art that various changes can be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-11 can be modified, and that the foregoing discussion of certain of these embodiments does not necessarily represent a complete description of all possible embodiments. For example, one or more of the activities of the methods described herein can include different activities and be performed by many different elements, in many different orders. As another example, the elements within one or more of the systems described herein can be interchanged or otherwise modified.

Generally, replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

Further, the claims are not intended to include, and should not be interpreted to include, means-plus-function or step-plus-function limitations, unless such a limitation is explicitly recited in a given claim using the phrase(s) "means for" or "step for," respectively.

The invention claimed is:

1. A system for managing production and distribution of water extracted from air comprising:
 a plurality of water generation units arranged in an array, each comprising a controller configured to control a production rate of water extracted from the air based on one or more operational parameters for water production;
 a water supply unit comprising a reservoir in fluid communication with each of the plurality of water generation units, wherein the reservoir is configured to store at least part of the water extracted from the air by the plurality of water generation units;
 an array communications unit configured to communicate to a communications channel and each of the plurality of water generation units;
 wherein the one or more operational parameters for water production are communicated across the communications channel via the array communications unit; and,
 wherein the system is configured to maintain a water level of the reservoir based on the one or more operational parameters for water production.

2. The system of claim 1, wherein the communications channel is established by a cloud network, a local area network, Internet, a satellite, a serial bus, wired connections, a cellular tower, or a combination thereof.

3. The system according to claim 1, wherein the array communications unit is configured to establish a wired communication link, a wireless communication link, or a combination thereof.

4. The system of claim 1, wherein each controller of the plurality of water generation units is configured to receive one or more commands via the communications channel.

5. The system of claim 4, wherein the one or more commands comprise: a start water production command, a stop water production command, a start transfer of water to the reservoir command, a stop transfer of water to the reservoir command, a read configuration command, a write configuration command, a reboot command, a memory programming command, an upgrade command, or combinations thereof.

6. The system of claim 1, wherein each controller of the plurality of water generation units is configured to send data indicative of the one or more operational parameters for water production via the communications channel.

7. The system of claim 1, wherein the system is configured to transmit a signal to at least one controller of the plurality of water generation units to pump water to the reservoir via one or more water conduits based on the one or more operational parameters for water production.

8. The system of claim 7, wherein the system is configured to transmit the signal to the at least one controller of the plurality of water generation units to pump water to the reservoir via based on a water level in the reservoir, a water usage rate, a water production rate or combinations thereof.

9. The system of claim 1, further comprising one or more sensors configured to generate one or more signals indicative of: an ambient temperature, an ambient relative humidity, a solar insolation, a photovoltaic voltage, a photovoltaic current, a photovoltaic power, a water extraction efficiency, an accumulated water count, a water production rate, a water reservoir level, a water reservoir usage, a water dispensing rate, or combinations thereof.

10. The system of claim 9, wherein the one or more operational parameters for water production are based on the one or more signals generated by the one or more sensors.

11. The system of claim 1, wherein each controller of the plurality of water generation units is configured to vary operation of the water generation unit based on the one or more operational parameters communicated over the communications channel.

12. The system of claim 1, wherein each controller of the plurality of water generation units is configured to vary operation of the water generation unit based on real-time variations in ambient conditions, forecast variations in ambient conditions, or a combination thereof.

13. The system of claim 12, wherein the variations in ambient conditions change an amount of thermal energy generated by a thermal unit, a level of electrical power provided by a solar power unit, or a combination thereof.

14. The system of claim 1, wherein each of the plurality of water generation units comprise a PV panel configured to provide power to the water generation unit; and, wherein each controller of the plurality of water generation units is configured to control the water generation unit in response to diurnal variations in an amount of electrical power generated by each of the PV panels.

15. A system for managing production and distribution of liquid water extracted from air comprising:
 a first water management area comprising a first array of water generation units and a first reservoir in fluid communication with the first array of water generation units, wherein the first reservoir is configured to store at least part of the water extracted from the air by the first array of water generation units;
 a second water management area comprising a second array of water generation units and a second reservoir in fluid communication with the second array of water generation units, wherein the second reservoir is configured to store at least part of the water extracted from the air by the second array of water generation units;
 wherein each water generation unit comprises a controller configured to control a production rate of water extracted from the air based on one or more operational parameters for water production;
 wherein the one or more operational parameters for water production are communicated across a communications channel connecting the first and second water management areas; and,
 wherein the system is configured to maintain a water level of the reservoir based on the one or more operational parameters for water production.

16. A method for managing production and distribution of water extracted from air comprising:
 establishing a communications channel to communicate to a plurality of water generation units arranged in an array;

determining one or more operational parameters;

transmitting the one or more operational parameters via the communications channel;

controlling, by a controller of each of the plurality of water generation units, a production rate of water extracted from the air based on the one or more operational parameters;

transferring, via at least one water conduit, a volume of water to a reservoir of a water supply unit from at least one of the plurality of water generation units; and, transmitting a signal to at least one controller of the plurality of water generation units to pump water to the reservoir via one or more water conduits based on the one or more operational parameters for water production;

transmit the signal to at least one controller of the plurality of water generation units to pump water to the reservoir via based on a water level in the reservoir, a water usage rate, a water production rate or combinations thereof.

17. The method according to claim 16, wherein determining the one or more operational parameters comprises: determining a water level of the reservoir, determining an accumulated water count of at least one of the plurality of water generation units, or a combination thereof.

18. The method according to claim 17, wherein transferring the volume of water to the reservoir comprises transferring the volume of the water based on the water level of the reservoir, an accumulated water count of at least one of the plurality of water generation units, or a combination thereof.

19. The method according to claim 16, further comprising:

sensing one or more signals from one or more sensors; and, determining the one or more operational parameters comprises determining the one or more operational parameters based on the one or more signals from the one or more sensors.

20. A system for managing production and distribution of water extracted from air comprising:

a plurality of water generation units arranged in an array, each comprising a controller configured to control a production rate of water extracted from the air based on one or more operational parameters for water production;

a water supply unit comprising a reservoir in fluid communication with each of the plurality of water generation units, wherein the reservoir is configured to store at least part of the water extracted from the air by the plurality of water generation units;

an array communications unit configured to communicate to a communications channel and each of the plurality of water generation units;

wherein the one or more operational parameters for water production are communicated across the communications channel via the array communications unit;

wherein the system is configured to transmit a signal to the at least one controller of the plurality of water generation units to pump water to the reservoir via one or more water conduits based on the one or more operational parameters for water production;

and, wherein the system is configured to transmit the signal to the at least one controller of the plurality of water generation units to pump water to the reservoir based on a water level in the reservoir, a water usage rate, a water production rate or combinations thereof.

* * * * *